(12) United States Patent
Yanai

(10) Patent No.: US 12,169,627 B2
(45) Date of Patent: Dec. 17, 2024

(54) IMAGE DISPLAY METHOD, INFORMATION PROCESSING APPARATUS, AND RECORDING MEDIUM HAVING PROGRAM RECORDED THEREON

(71) Applicant: SEIKO EPSON CORPORATION, Tokyo (JP)

(72) Inventor: Kohei Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/127,698

(22) Filed: Mar. 29, 2023

(65) Prior Publication Data

US 2023/0314914 A1    Oct. 5, 2023

(30) Foreign Application Priority Data

Mar. 30, 2022 (JP) ................. 2022-055409

(51) Int. Cl.
| | |
|---|---|
| *G06F 3/04845* | (2022.01) |
| *G03B 17/54* | (2021.01) |
| *G06F 3/048* | (2013.01) |
| *G06F 3/0488* | (2022.01) |
| *H04N 23/56* | (2023.01) |
| *H04N 23/63* | (2023.01) |
| *H04N 23/80* | (2023.01) |

(52) U.S. Cl.
CPC ......... *G06F 3/04845* (2013.01); *G03B 17/54* (2013.01); *G06F 3/048* (2013.01); *G06F 3/0488* (2013.01); *H04N 23/56* (2023.01); *H04N 23/632* (2023.01); *H04N 23/80* (2023.01)

(58) Field of Classification Search
CPC .... G06F 3/048; G06F 3/04845; G06F 3/0488; G03B 17/54; H04N 23/56; H04N 23/632; H04N 23/80
USPC ........................................................ 345/156
See application file for complete search history.

(56) References Cited

U.S. PATENT DOCUMENTS

| | | | | |
|---|---|---|---|---|
| 9,996,909 | B2* | 6/2018 | Masuko | H04N 9/3185 |
| 10,820,650 | B2* | 11/2020 | Bell | A41D 27/00 |
| 11,384,463 | B2* | 7/2022 | Sights | B41M 5/26 |
| 11,496,721 | B2* | 11/2022 | Ichieda | H04N 9/3185 |
| 11,549,211 | B2* | 1/2023 | Sights | D06M 10/005 |
| 11,562,423 | B2* | 1/2023 | Sights | A41H 42/00 |
| 2019/0272679 | A1* | 9/2019 | Brodsky | G06F 30/20 |
| 2019/0364253 | A1 | 11/2019 | Miyatani et al. | |
| 2021/0160469 | A1 | 5/2021 | Sakai | |
| 2021/0306605 | A1 | 9/2021 | Ichieda et al. | |

FOREIGN PATENT DOCUMENTS

| | | |
|---|---|---|
| JP | 2019-205133 A | 11/2019 |
| JP | 2021-087043 A | 6/2021 |
| JP | 2021-158625 A | 10/2021 |

* cited by examiner

*Primary Examiner* — Jason M Mandeville
(74) *Attorney, Agent, or Firm* — Oliff PLC

(57) ABSTRACT

An image display method includes: acquiring a first image; acquiring a captured image obtained by imaging a projection receiving object of projection light; and displaying a setting image including a first region in which the first image is displayed, a second region in which the captured image is displayed, and a third region in which a preview image including at least a part of a deformed image obtained by deforming the first image according to an image of the projection receiving object included in the captured image is displayed.

14 Claims, 19 Drawing Sheets

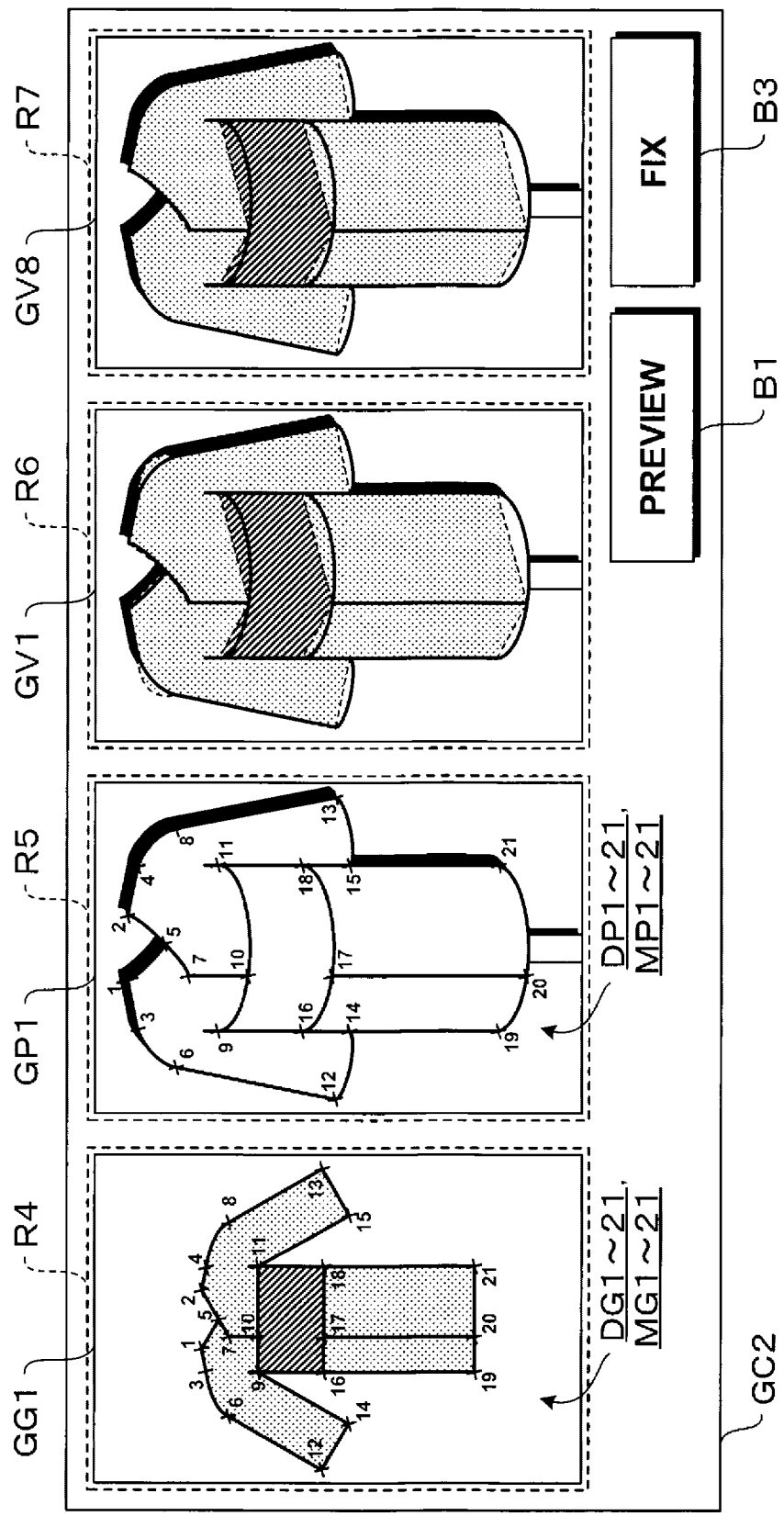

IMAGE DISPLAY METHOD, INFORMATION PROCESSING APPARATUS, AND RECORDING MEDIUM HAVING PROGRAM RECORDED THEREON

The present application is based on, and claims priority from JP Application Serial Number 2022-055409, filed Mar. 30, 2022, the disclosure of which is hereby incorporated by reference herein in its entirety.

BACKGROUND

1. Technical Field

The present disclosure relates to an image display method, an information processing apparatus, and a recording medium having a program recorded thereon.

2. Related Art

A technique for deforming a shape of an image to be displayed into a desired shape has been developed. For example, JP-A-2021-158625 discloses an image display system that images a projection receiving object to be projected by projection light, and that prompts a user to execute an operation of setting a shape of a projection image to be projected onto the projection receiving object according to a shape of the projection receiving object recorded in a captured image. In the image display system, a captured image obtained by imaging the projection receiving object of the projection light, and an object (specifically, a square image) for setting a region occupied by a projection image projected onto the projection receiving object are displayed on a touch panel for the user to perform a setting operation. The user changes a position and a shape of the object according to the shape of the projection receiving object recorded in the captured image. The projection image is disposed on the projection receiving object according to the position and the shape of the object.

However, in the related-art image display system, since a projection image before changing the shape and a projection image after changing the shape are not simultaneously displayed, the user cannot directly compare the shapes of the projection images before and after the change. Therefore, it is difficult for the user to accurately check whether the projection image is appropriately deformed into a desired shape.

SUMMARY

An aspect of an image display method according to the present disclosure includes: acquiring a first image; acquiring a captured image obtained by imaging a projection receiving object of projection light; and displaying a setting image including a first region in which the first image is displayed, a second region in which the captured image is displayed, and a third region in which a preview image including at least a part of a deformed image obtained by deforming the first image according to an image of the projection receiving object included in the captured image is displayed.

An aspect of an information processing apparatus according to the present disclosure includes: one or more processors, in which the one or more processors acquire a first image, acquire a captured image obtained by imaging a projection receiving object of projection light, and cause a display device to display a setting image including a first region in which the first image is displayed, a second region in which the captured image is displayed, and a third region in which a preview image including at least apart of a deformed image obtained by deforming the first image according to an image of the projection receiving object included in the captured image is displayed.

An aspect of a recording medium having a program recorded thereon according to the present disclosure causes a processor to acquire a first image, acquire a captured image obtained by imaging a projection receiving object of projection light, and cause a display device to display a setting image including a first region in which the first image is displayed, a second region in which the captured image is displayed, and a third region in which a preview image including at least a part of a deformed image obtained by deforming the first image according to an image of the projection receiving object included in the captured image is displayed.

BRIEF DESCRIPTION OF THE DRAWINGS

FIG. 3 is an illustrative diagram showing a setting image GC1a.

FIG. 34 is an illustrative diagram showing a setting image GC2.

DESCRIPTION OF EXEMPLARY EMBODIMENTS

Figure 1:
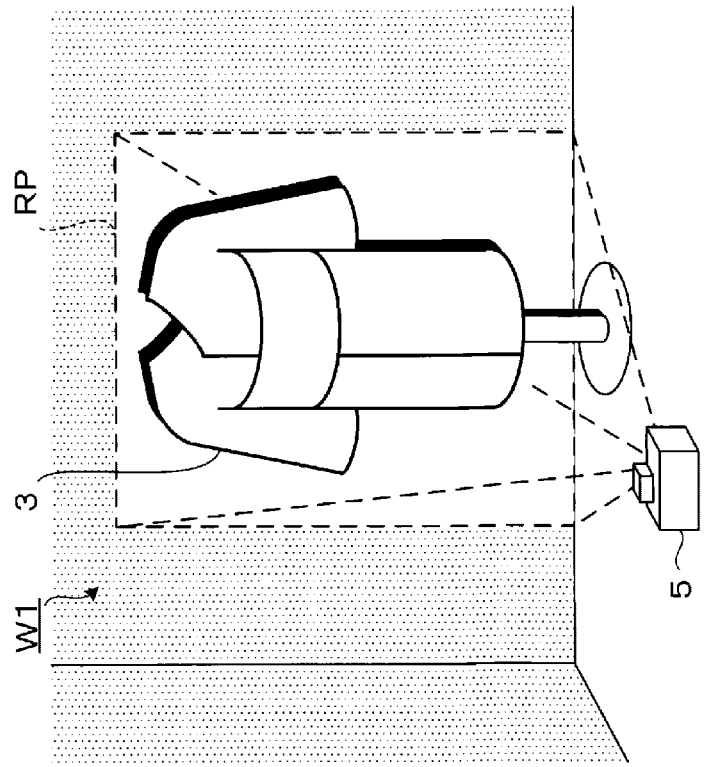
FIG. 1 is a schematic diagram showing a state in which a projection receiving object of projection light is imaged.

Hereinafter, a preferred embodiment according to the present disclosure will be described with reference to the accompanying drawings. In the drawings, a dimension and a scale of each part may be different from actual ones, and some parts are schematically shown for easy understanding. Further, a scope of the present disclosure is not limited to these embodiments unless it is stated in the following description that the present disclosure is particularly limited. Further, in the present specification and claims, when a numerical range is expressed using "$\Phi$ to $\Psi$" (both $\Phi$ and $\Psi$ are numerical values), the range includes numerical values of an upper limit ($\Psi$) and a lower limit ($\Phi$). Further, units of the upper limit ($\Psi$) and the lower limit ($\Phi$) are the same.

1. First Embodiment

In a first embodiment, an image display method, an information processing apparatus, and a program according to the present disclosure will be described by exemplifying a computer that causes a display device to display a setting image including an image before a shape is changed, a captured image obtained by imaging a projection receiving object of light projected from a projector, and a preview image including a part or all of an image whose shape is changed based on the captured image.

1.1. Overview of Computer

Figure 2:
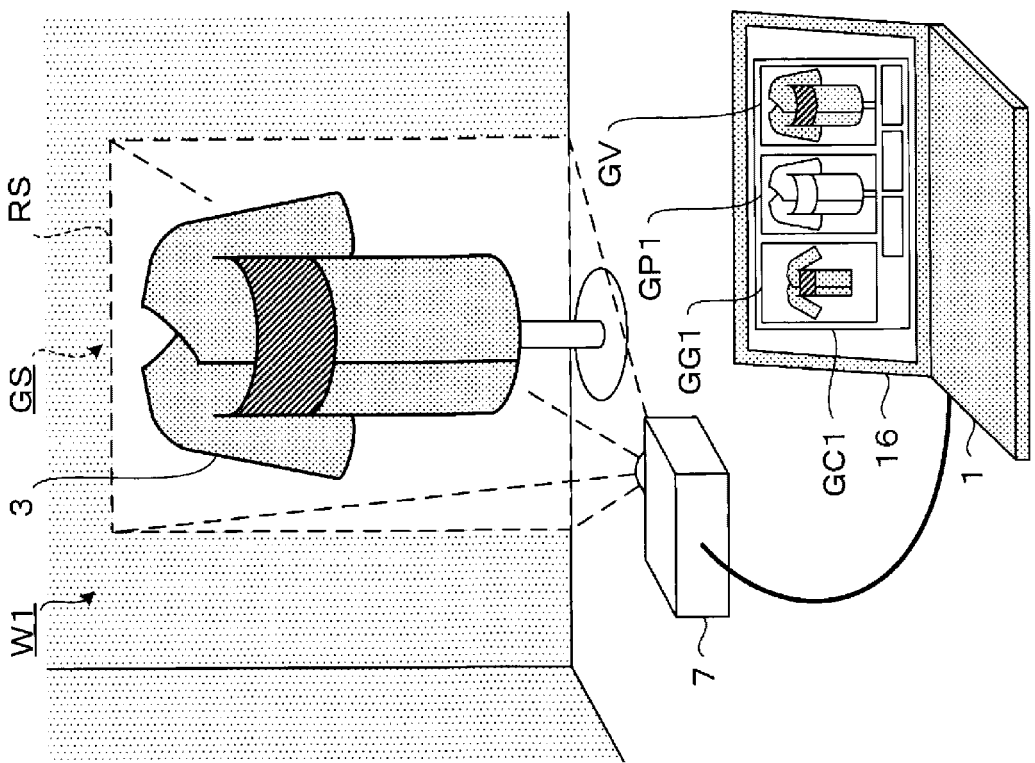
FIG. 2 is a schematic diagram showing a state in which a projection image GS is projected onto the projection receiving object of the projection light.

Hereinafter, an overview of a computer 1 according to the first embodiment will be described with reference to FIGS. 1 and 2. FIG. 1 is a schematic diagram showing a state in which the projection receiving object of projection light is imaged. FIG. 2 is a schematic diagram showing a state in which a projection image GS is projected onto the projection receiving object of the projection light. In the embodiment, a torso 3 is the projection receiving object of light projected from a projector 7. The projector 7 displays the projection image GS by projecting the projection light onto a projection region RS of a wall surface W1 and the torso 3 disposed in front of the projection region RS.

A camera 5 acquires the captured image GP1 by imaging an imaging region RP of the wall surface W1, and the torso 3 disposed in front of the imaging region RP. The computer 1 causes a touch panel 16 provided in the computer 1 to display a setting image GC1 including the captured image GP1 that is acquired from the camera 5 fixed to a predetermined position and the image GG1 that is acquired from an external server (not shown). Further, the computer 1 deforms the image GG1 based on an operation from a user on the setting image GC1 displayed on the touch panel 16. The computer 1 causes the touch panel 16 to display a preview image GV including at least a part of the deformed image GG1. When the user checks the image GG1 and the preview image GV and determines that the image GG1 is appropriately deformed, the computer 1 outputs the deformed image GG1 to the projector 7 based on an operation from the user. The projector 7 displays the projection image GS including the deformed image GG1 by projecting projection light based on the deformed image GG1.

That is, the user can display the projection image GS according to a shape of the torso 3 by deforming the image GG1 according to the shape of the torso 3 recorded in the captured image GP1. Further, the user can check whether the image GG1 is appropriately deformed by comparing the image GG1 with the preview image GV including the deformed image GG1.

1.2. Display Method and Deformation Method for Image

Hereinafter, an image display method and an image GG1 deformation method according to the first embodiment will be described with reference to FIGS. 3 to 27. In the embodiment, when setting images GC1$a$ to GC1$p$ described later are not distinguished from one another, the setting images GC1$a$ to GC1$p$ may be referred to as the "setting images GC1". Further, when preview images GV1 to GV8 described later are not distinguished from one another, the preview images GV1 to GV8 may be referred to as the "preview images GV". Further, when the images GG1 deformed based on the captured image GP1, including images GG2 to GG8 described later, are not distinguished from one another, the deformed images GG1 may be referred to as "deformed images". Further, when points on the image GG1, including points DG1 to DG26 described later, are not distinguished from one another, the points on the image GG1 may be referred to as "points DG". Further, when points on the captured image GP1, including points DP1 to DP26 described later, are not distinguished from one another, the points on the captured image GP1 may be referred to as "points DP". Further, when markers MG1 to MG26 described later are not distinguished from one another, the markers MG1 to MG26 may be referred to as "markers MG". Further, when markers MP1 to MP26 described later are not distinguished from one another, the markers MP1 to MP26 may be referred to as "markers MP".

Figure 3:
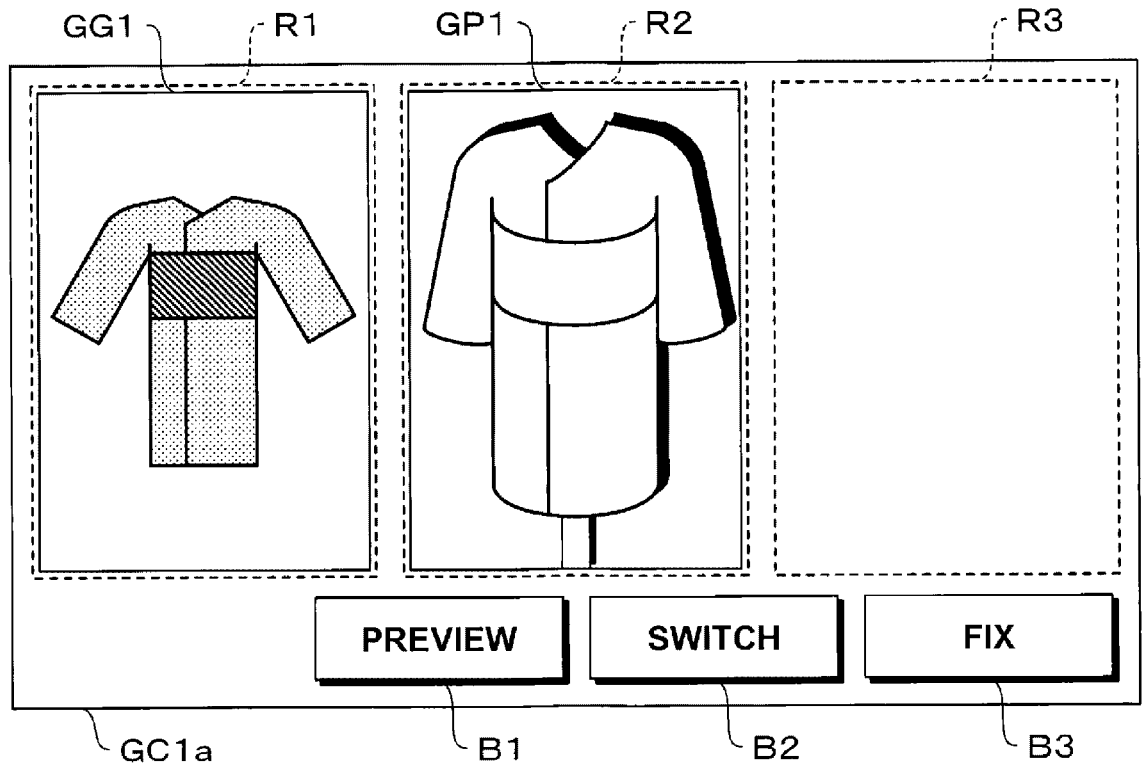

FIG. 3 is an illustrative diagram showing the setting image GC1$a$. The setting image GC1$a$ is an aspect of the setting image GC1.

The setting image GC1 includes a region R1, a region R2, and a region R3. Further, the setting image GC1 includes a button B1, a button B2, and a button B3. The image GG1 is displayed in the region R1. The captured image GP1 is displayed in the region R2. The preview image GV is displayed in the region R3.

The setting image GC1$a$ is the setting image GC1 first displayed on the touch panel 16 after the computer 1 acquires the image GG1 and the captured image GP1. In the setting image GC1$a$, the image GG1 is displayed in the region R1, and the captured image GP1 is displayed in the region R2. In a state in which the setting image GC1$a$ is displayed on the touch panel 16, the user designates the one or more points DG on the image GG1 by touching the touch panel 16. The computer 1 receives an operation from the user who designates the one or more points DG on the image GG1. Further, the user designates the one or more points DP on the captured image GP1 by touching the touch panel 16.

The computer 1 receives an operation from the user who designates the one or more points DP on the captured image GP1.

Figure 4:
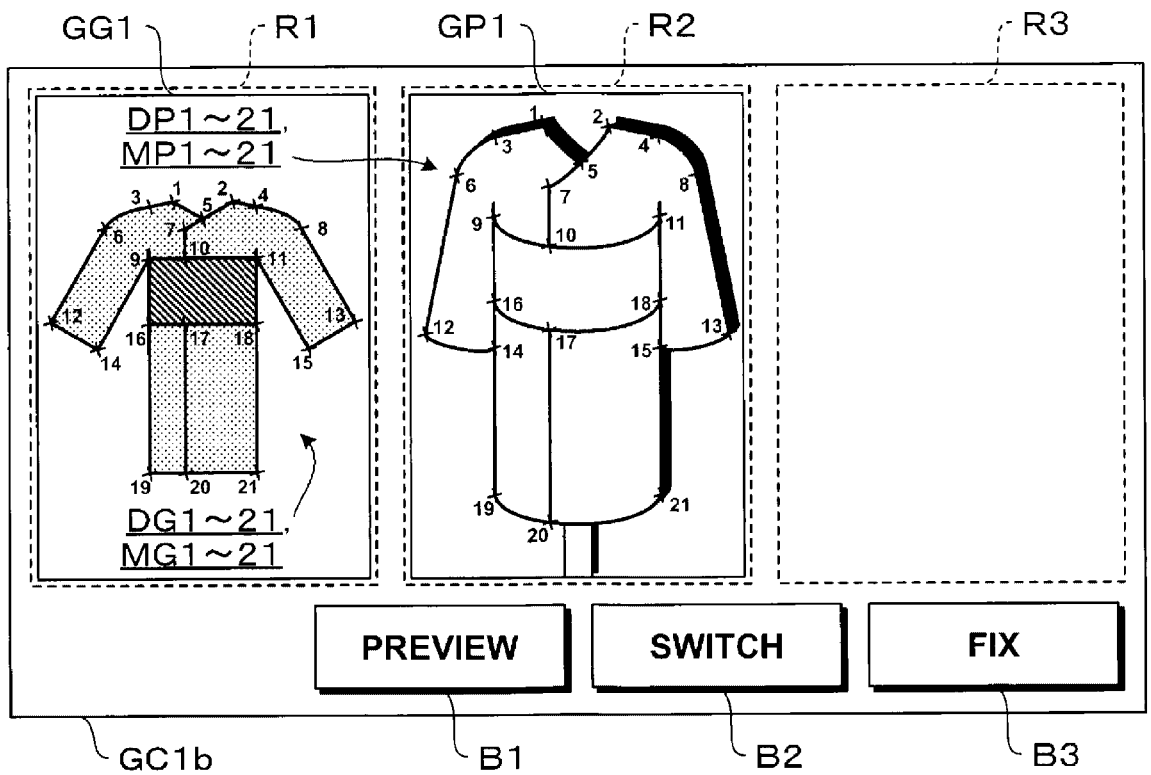
FIG. 4 is an illustrative diagram showing a setting image GC1b.

FIG. 4 is an illustrative diagram showing the setting image GC1b. The setting image GC1b is an aspect of the setting image GC1.

In a state in which the setting image GC1a is displayed on the touch panel 16, the computer 1 changes the setting image GC1 to be displayed on the touch panel 16 from the setting image GC1a to the setting image GC1b by receiving an operation from the user who designates the points DG1 to DG21 on the image GG1 and an operation from the user who designates the points DP1 to DP21 on the captured image GP1. The setting image GC1b is similar to the setting image GC1a except that markers MG1 to MG21 are displayed in a manner of being superimposed on the image GG1 and markers MP1 to MP21 are displayed in a manner of being superimposed on the captured image GP1. In FIG. 4, a point DPx is a point corresponding to a point DGx. Here, the value x represents an integer of one or more. For example, the point DP1 corresponds to the point DG1. Further, the point DP20 corresponds to the point DG20.

In the embodiment, the operation of designating the point DG20 on the image GG1 may be referred to as a "first operation". Further, the operation of designating the point DP20 on the captured image GP1 may be referred to as a "second operation".

The markers MG1 to MG21 for indicating positions of the points DG1 to DG21 are displayed in a manner of being superimposed on the image GG1 included in the setting image GC1b. In FIG. 4, a marker MGy corresponds to a point DGy. Here, the value y represents an integer of one or more. For example, the marker MG1 corresponds to the point DG1. Further, the marker MG20 corresponds to the point DG20. Further, the marker MGy includes a cross symbol indicating a position of the point DGy, and a number indicating the value y. The number indicating the value y included in the marker MGy is displayed in a predetermined range from the point DGy.

The markers MP1 to MP21 for indicating positions of the points DP1 to DP21 are displayed in a manner of being superimposed on the captured image GP1 included in the setting image GC1b. In FIG. 4, a marker MPz corresponds to a point DPz. Here, the value z represents an integer of one or more. For example, the marker MP1 corresponds to the point DP1. Further, the marker MP20 corresponds to the point DP20. Further, the marker MPz includes a cross symbol indicating a position of the point DPz and a number indicating the value z. The number indicating the value z included in the marker MPz is displayed in a predetermined range from the point DPz.

Figure 5:
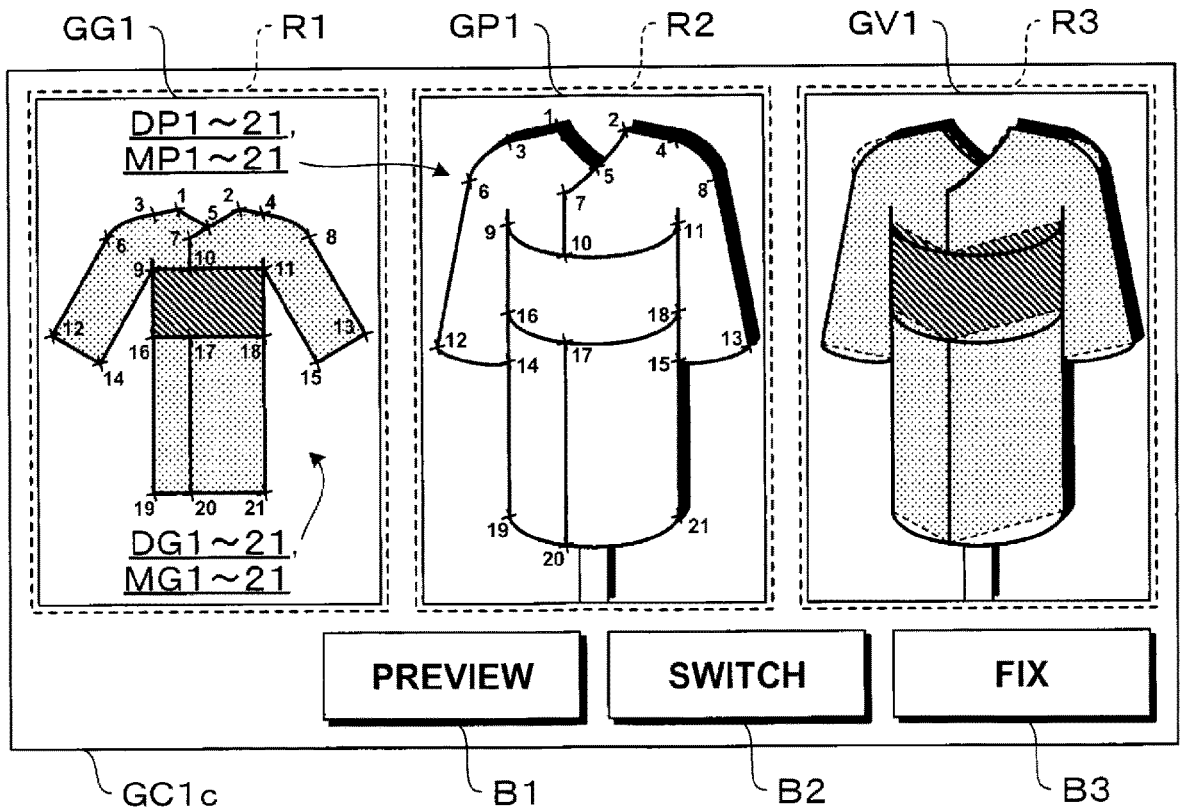
FIG. 5 is an illustrative diagram showing a setting image GC1c.

FIG. 5 is an illustrative diagram showing the setting image GC1c. The setting image GC1c is an aspect of the setting image GC1.

In a state in which the setting image GC1b is displayed on the touch panel 16, the computer 1 changes the setting image GC1 to be displayed on the touch panel 16 from the setting image GC1b to the setting image GC1c by receiving an operation from the user who touches the button B1. The setting image GC1c is similar to the setting image GC1b except that the preview image GV1 is displayed in the region R3.

Figure 6:
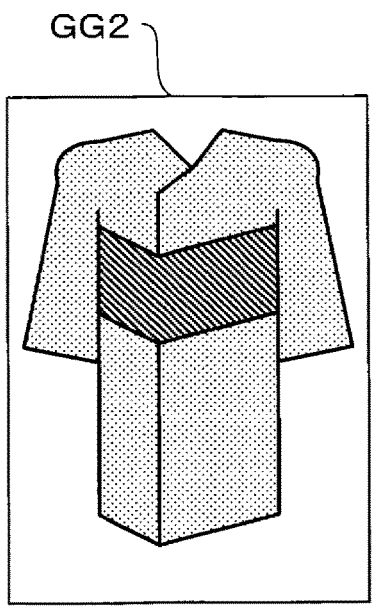
FIG. 6 is a schematic diagram showing an image GG2.

The button B1 is a button for the user to instruct the computer 1 to deform the image GG1. The user instructs the computer 1 to deform the image GG1 by touching the button B1 displayed on the touch panel 16. That is, the operation of touching the button B1 is an operation of instructing the deformation of the image GG1. The computer 1 deforms the image GG1 into the image GG2 by receiving an operation from the user who touches the button B1 on the setting image GC1b. FIG. 6 is a schematic diagram showing the image GG2.

After generating the image GG2 by deforming the image GG1, the computer 1 generates the preview image GV1 by combining the image GG2 and the captured image GP1. The computer 1 displays the preview image GV1 in the region R3. When the image GG2 and the captured image GP1 are combined, the image GG2 may be transmitted at a predetermined transmittance, and the transmitted image GG2 may be displayed by being superimposed on the captured image GP1.

In the embodiment, the operation of instructing the deformation of the image GG1 by touching the button B1 may be referred to as a "fifth operation".

Figure 7:
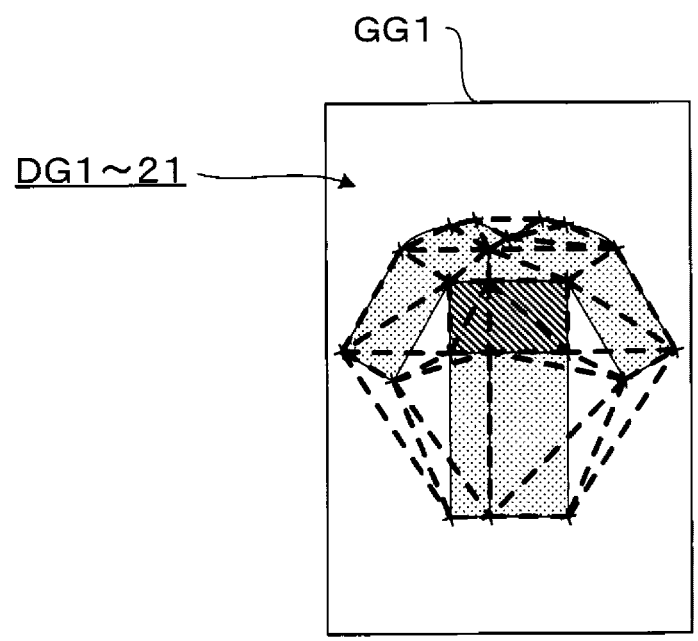
FIG. 7 is a schematic diagram showing a state in which the image GG1 is divided into a plurality of small regions.
Figure 8:
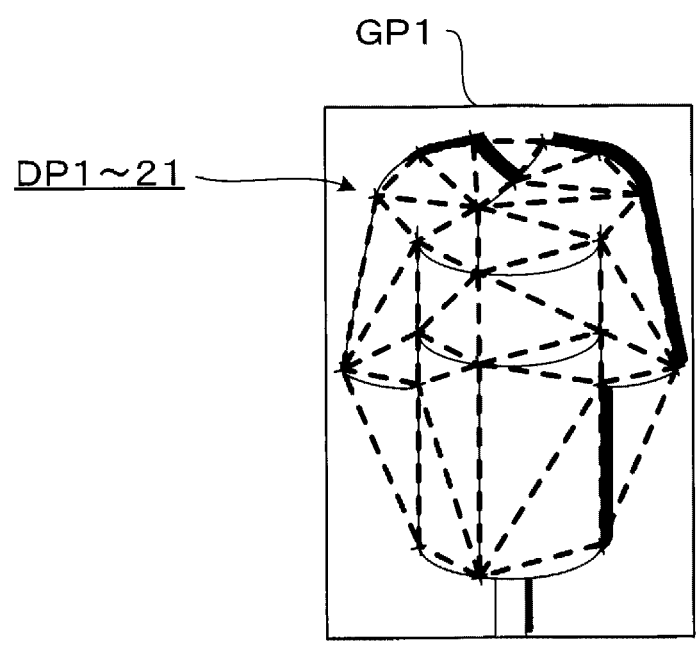
FIG. 8 is a schematic diagram showing a state in which a captured image GP1 is divided into a plurality of small regions.
Figure 9:
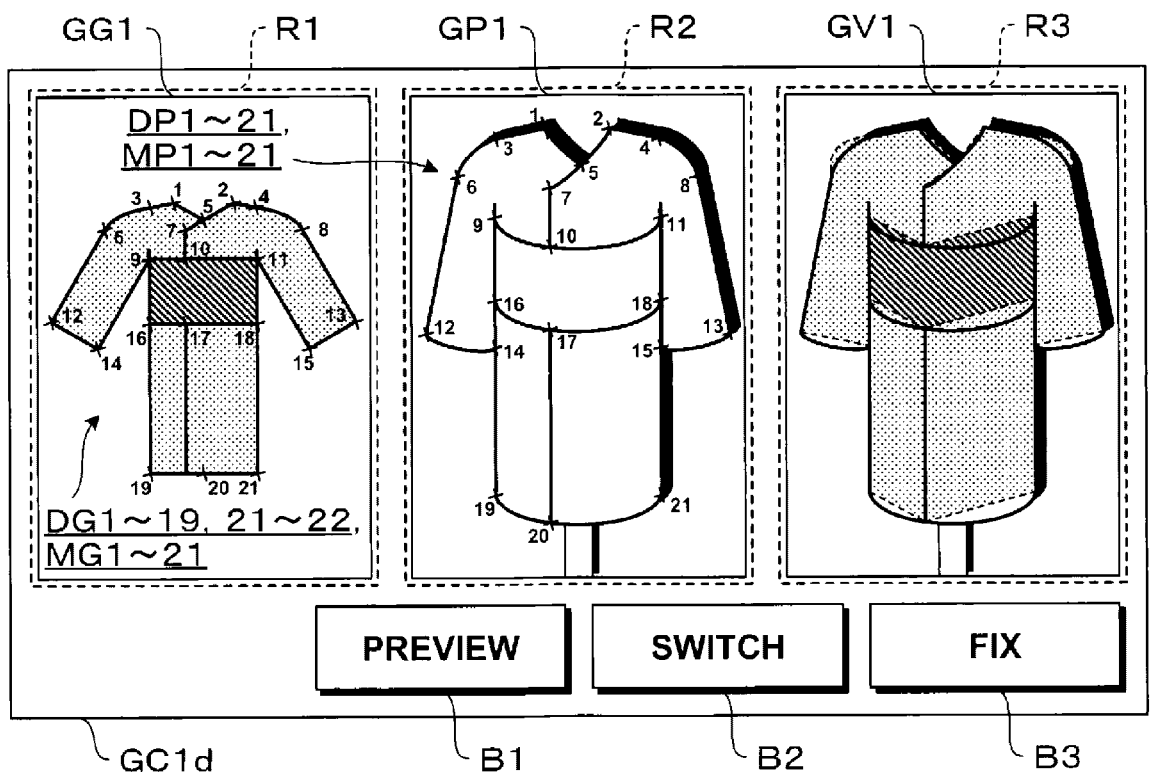
FIG. 9 is an illustrative diagram showing a setting image GC1d.

Hereinafter, the deformation of the image GG1 will be described in detail with reference to FIGS. 7 and 8. In the following description, the deformation of the image GG1 will be described by exemplifying a case in which the image GG1 is deformed into the image GG2. FIG. 7 is a schematic diagram showing a state in which the image GG1 is divided into a plurality of small regions. FIG. 8 is a schematic diagram showing a state in which the captured image GP1 is divided into a plurality of small regions. The image GG1 is divided into the plurality of small regions by a plurality of triangles formed by connecting the points DG1 to DG21 to one another using a plurality of line segments. Here, it is preferable that the plurality of line segments are connected in a manner of not intersecting with one another. Further, the captured image GP1 is divided into a plurality of small regions by a plurality of triangles formed by connecting the points DP1 to DP21 to one another using a plurality of line segments. Here, when a point among the points DG1 to DG21 is connected to another point among the points DG1 to DG21 in the image GG1, a point among the points DP1 to DP21 corresponding to the point among the points DG1 to DG21 is connected to another point among the points DP1 to DP21 corresponding to the other point among the points DG1 to DG21 in the captured image GP1. As a specific example, when the point DG17 is connected to the point DG20 in the image GG1, the point DP17 corresponding to the point DG17 is connected to the point DP20 corresponding to the point DG20 in the captured image GP1. That is, a one-to-one correspondence relationship is established between each of the plurality of triangles that divide the image GG1 and a corresponding one of the plurality of triangles that divide the captured image GP1. The computer 1 generates a plurality of conversion equations for deforming the image GG1 into the image GG2 based on the correspondence relationship between the points DG1 to DG21 and the points DP1 to DP21. Further, the computer 1 deforms the image GG1 into the image GG2 based on the conversion equations. The plurality of conversion equations are conversion equations for matching a shape of each of the plurality of triangles that divide the image GG1 and a shape of a corresponding one of the plurality of triangles that divide the captured image GP1 based on the correspondence relationship. As the conversion equation, for example, a conversion equation of affine conversion for converting the shape of each of the plurality of triangles that divide the image GG1 into the shape of a corresponding one of the plurality of triangles that divide the captured image GP1 may be used. FIG. 9 is an illustrative diagram showing the setting image GC1d. The setting image GC1d is an aspect of the setting image GC1.

In a state in which the setting image GC1c is displayed on the touch panel 16, the computer 1 changes the setting image GC1 to be displayed on the touch panel 16 from the setting image GC1c to the setting image GC1d by receiving an operation from the user for moving the marker MG20 from a position of the point DG20 to a position of a point DG22. The setting image GC1d is similar to the setting image GC1c except that a position at which the marker MG20 is displayed is a position corresponding to the position of the point DG22.

For example, when the user checks the preview image GV and determines that the image GG1 is not appropriately deformed, the user can re-deform the image GG1 by executing at least one of designating a point DG substitutable for the point DG designated on the image GG1 and designating a point DP substitutable for the point DP designated on the captured image GP1.

When designating the point DG substitutable for the point DG designated on the image GG1, for example, the user moves the marker MG by dragging the marker MG corresponding to the designated point DG and dropping the marker MG at a target position. A cross symbol of the moved marker MG indicates a position of the point DG substitute. That is, the user moves the marker MG corresponding to the designated point DG, and designates the point DG indicated by the moved marker MG as the point DG substitute of the designated point DG. The computer 1 changes the point DG corresponding to the moved marker MG by receiving an operation from the user who moves the marker MG. Further, the computer 1 updates the correspondence relationship between the point DP and the point DG as the correspondence relationship between the marker MG and the point DG changes.

When designating the point DP substitutable for the point DP designated on the captured image GP1, for example, the user moves the marker MP by dragging the marker MP corresponding to the designated point DP, and dropping the marker MP at a target position. A cross symbol of the moved marker MP indicates a position of the point DP substitute. That is, the user moves the marker MP corresponding to the designated point DP, and designates the point DP indicated by the moved marker MP as the point DP substitute for the designated point DP. The computer 1 changes the point DP corresponding to the moved marker MP by receiving an operation from the user who moves the marker MP. Further, the computer 1 updates the correspondence relationship between the point DG and the point DP as the correspondence relationship between the marker MP and the point DP changes.

The user designates the point DG22 substitutable for the point DG20 by moving the marker MG20 displayed on the touch panel 16. The computer 1 changes the point DG corresponding to the marker MG20 from the point DG20 to the point DG22 by receiving an operation from the user who moves the marker MG20. Further, the computer 1 changes the point DG corresponding to the point DP20 from the point DG20 to the point DG22.

In the embodiment, the operation of designating the point DG22 on the image GG1 substitutable for the point DG20 by moving the marker MG20 may be referred to as a "third operation".

Figure 10:
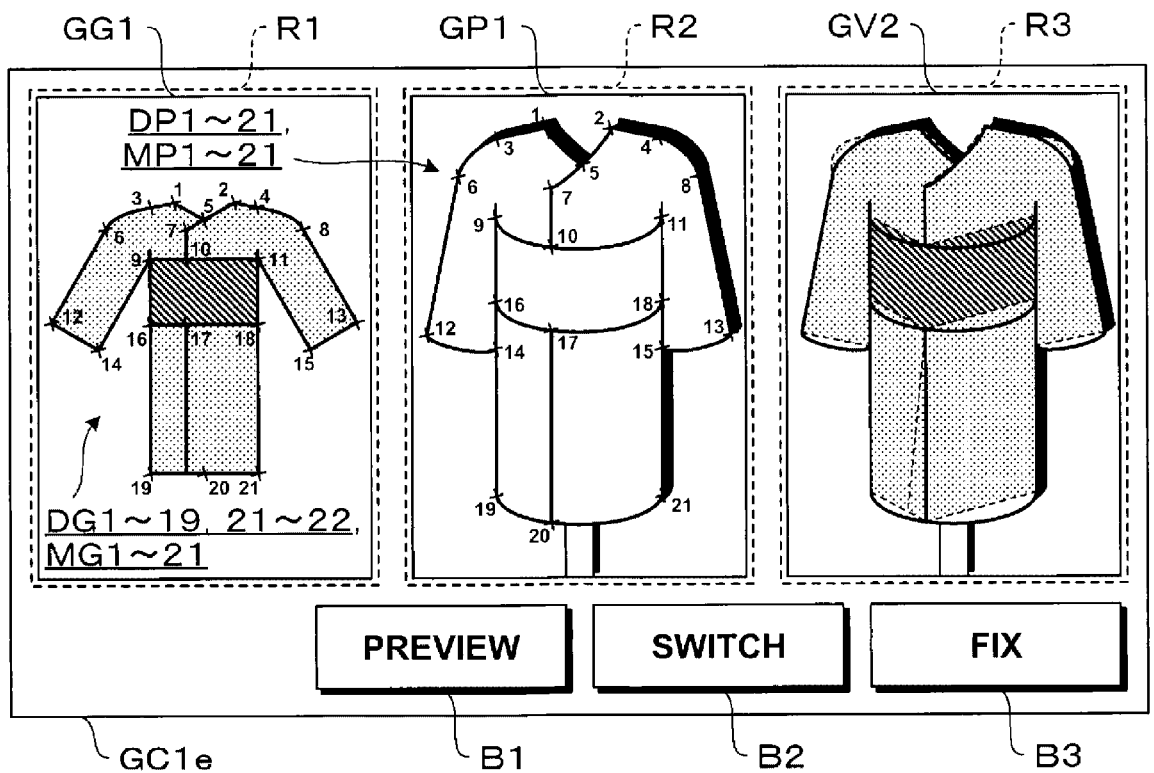
FIG. 10 is an illustrative diagram showing a setting image GC1e.

FIG. 10 is an illustrative diagram showing the setting image GC1e. The setting image GC1e is an aspect of the setting image GC1.

In a state in which the setting image GC1d is displayed on the touch panel 16, the computer 1 changes the setting image GC1 to be displayed on the touch panel 16 from the setting image GC1d to the setting image GC1e by receiving an operation from the user who touches the button B1. The setting image GC1e is similar to the setting image GC1d except that the preview image GV2 instead of the preview image GV1 is displayed in the region R3.

Figure 11:
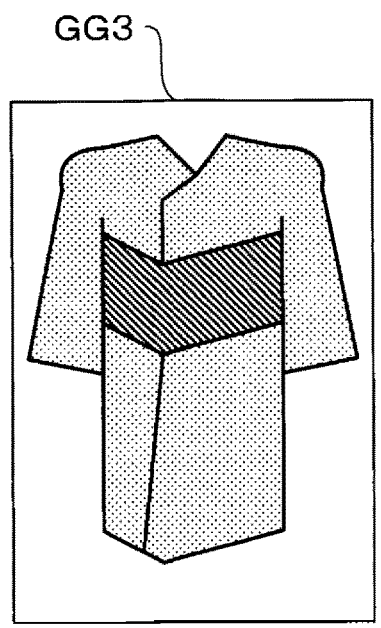
FIG. 11 is a schematic diagram showing an image GG3.

The computer 1 deforms the image GG1 into the image GG3 by receiving an operation from the user who touches the button B1 on the setting image GC1d. FIG. 11 is a schematic diagram showing the image GG3. Conversion equations for deforming the image GG1 into the image GG3 are generated based on a correspondence relationship between the points DG1 to DG19, the point DG21 as well as the point DG22 and the points DP1 to DP21.

The computer 1 generates the preview image GV2 by combining the image GG3 and the captured image GP1 after generating the image GG3 by deforming the image GG1. The computer 1 displays the preview image GV2 in the region R3.

Figure 12:
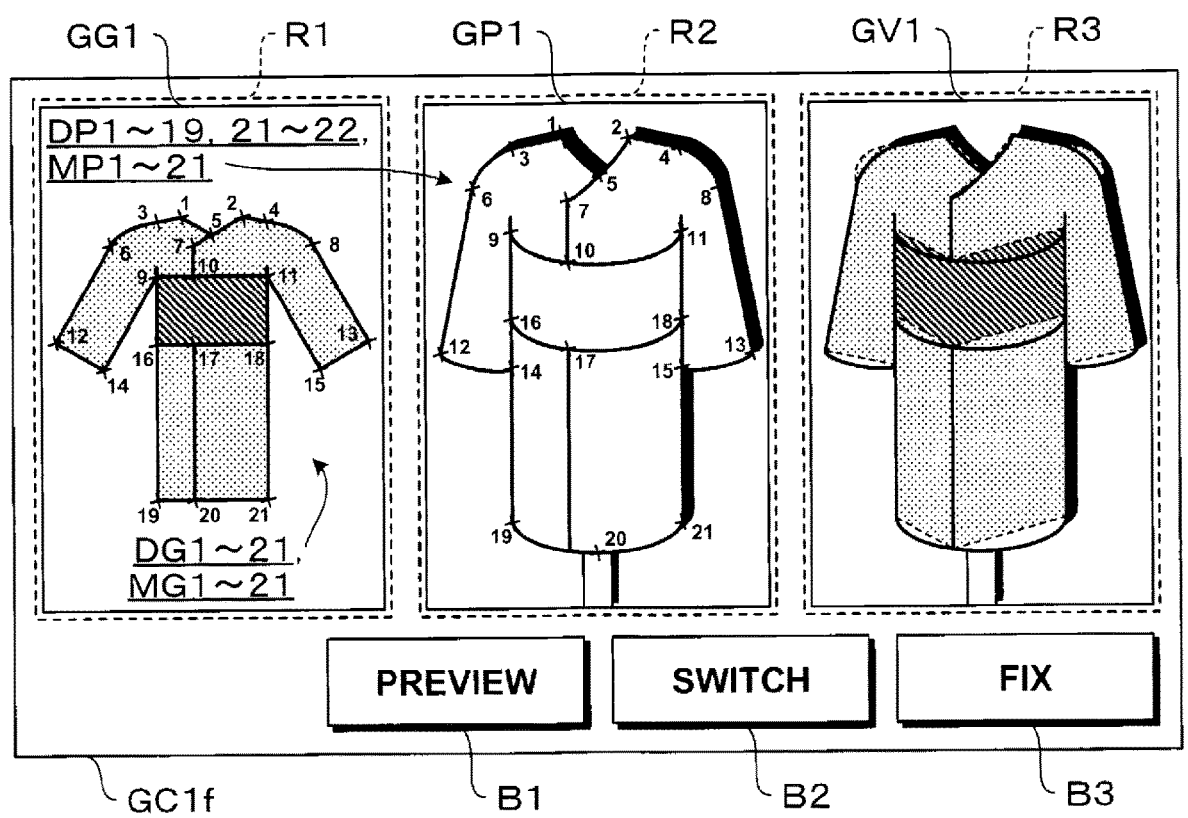
FIG. 12 is an illustrative diagram showing a setting image GC1f.

FIG. 12 is an illustrative diagram showing the setting image GC1f. The setting image GC1f is an aspect of the setting image GC1.

In a state in which the setting image GC1c is displayed on the touch panel 16, the computer 1 changes the setting image GC1 to be displayed on the touch panel 16 from the setting image GC1c to the setting image GC1f by receiving an operation from the user who moves the marker MP20 from the position of the point DP20 to the position of the point DP22. The setting image GC1f is similar to the setting image GC1c except that a position at which the marker MP20 is displayed is a position corresponding to the position of the point DP22.

The user designates the point DP22 substitutable for the point DP20 by moving the marker MP20 displayed on the touch panel 16. The computer 1 changes the point DP corresponding to the marker MP20 from the point DP20 to the point DP22 by receiving an operation from the user who moves the marker MP20. Further, the computer 1 changes the point DP corresponding to the point DG20 from the point DP20 to the point DP22.

In the embodiment, the operation of designating the point DP22 on the captured image GP1 substitutable for the point DP20 by moving the marker MP20 may be referred to as a "fourth operation".

Figure 13:
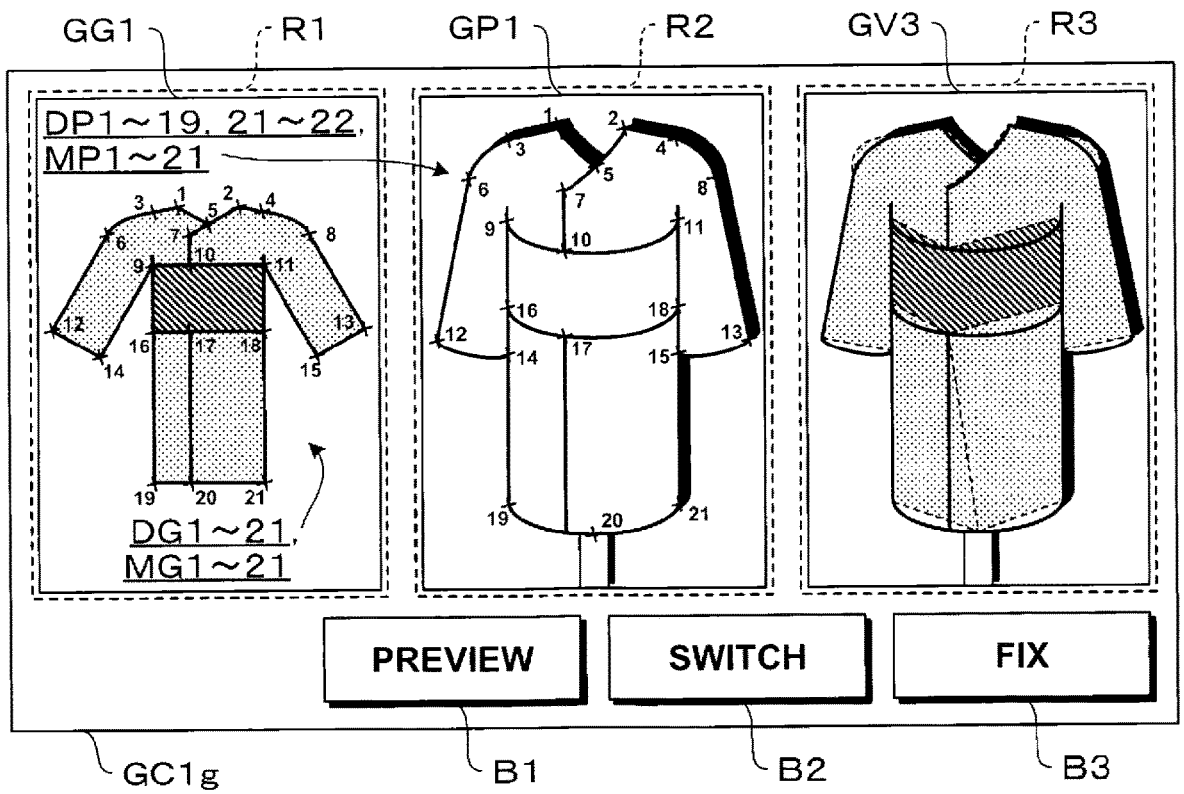
FIG. 13 is an illustrative diagram showing a setting image GC1g.

FIG. 13 is an illustrative diagram showing the setting image GC1g. The setting image GC1g is an aspect of the setting image GC1.

In a state in which the setting image GC1f is displayed on the touch panel 16, the computer 1 changes the setting image GC1 to be displayed on the touch panel 16 from the setting image GC1f to the setting image GC1g by receiving an operation from the user who touches the button B1. The setting image GC1g is similar to the setting image GC1f except that the preview image GV3 instead of the preview image GV1 is displayed in the region R3.

Figure 14:
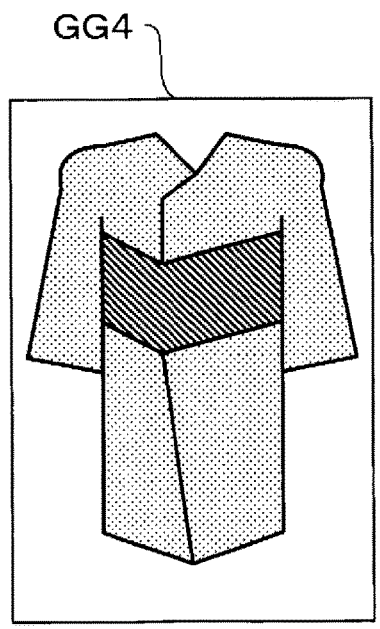
FIG. 14 is a schematic diagram showing an image GG4.

The computer 1 deforms the image GG1 into the image GG4 by receiving an operation from the user who touches the button B1 on the setting image GC1f. FIG. 14 is a schematic diagram showing the image GG4. Conversion equations for deforming the image GG1 into the image GG4 are generated based on a correspondence relationship between the points DG1 to DG21 and the points DP1 to DP19, the point DP21 as well as the point DP22.

The computer 1 generates the preview image GV3 by combining the image GG4 and the captured image GP1 after generating the image GG4 by deforming the image GG1. The computer 1 displays the preview image GV3 in the region R3.

Figure 15:
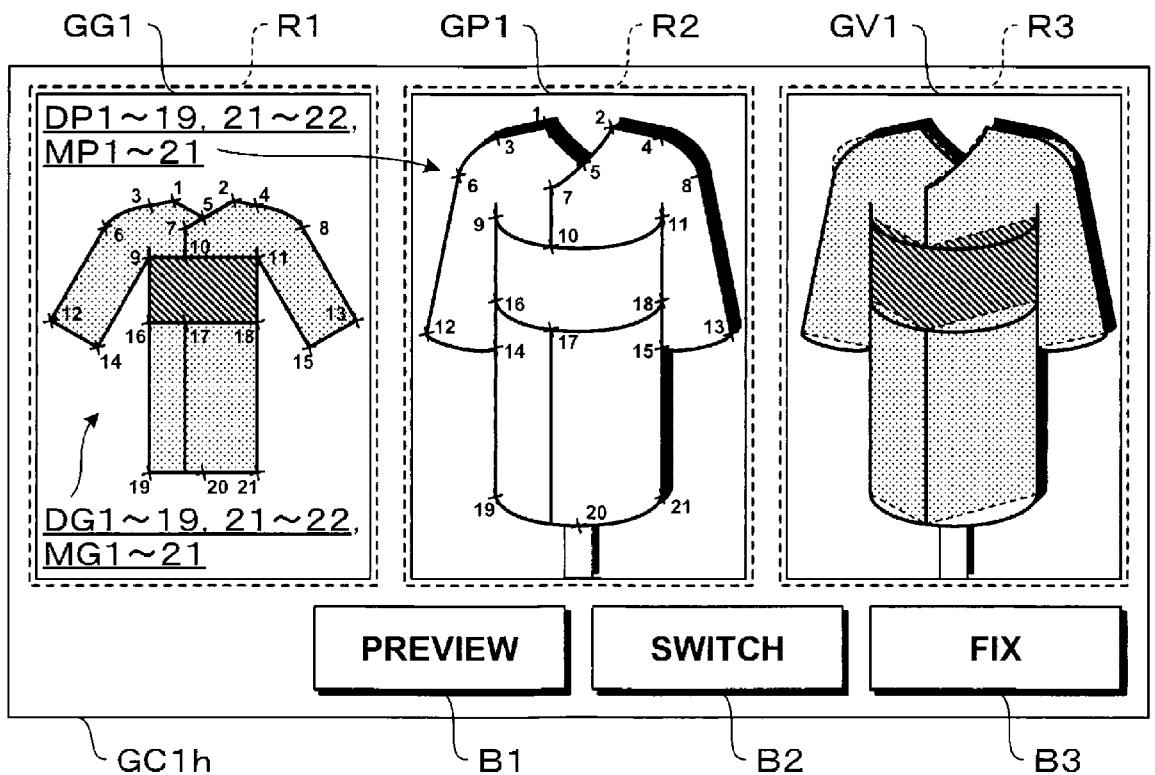
FIG. 15 is an illustrative diagram showing a setting image GC1h.

FIG. 15 is an illustrative diagram showing the setting image GC1*h*. The setting image GC1*h* is an aspect of the setting image GC1.

In a state in which the setting image GC1*c* is displayed on the touch panel 16, the computer 1 changes the setting image GC1 to be displayed on the touch panel 16 from the setting image GC1*c* to the setting image GC1*h* by receiving an operation from the user who moves the marker MG20 from the position of the point DG20 to the position of the point DG22 and an operation from the user who moves the marker MP20 from the position of the point DP20 to the position of the point DP22. The setting image GC1*h* is similar to the setting image GC1*c* except that the position at which the marker MG20 is displayed is a position corresponding to the position of the point DG22 and the position at which the marker MP20 is displayed is a position corresponding to the position of the point DP22.

The user designates the point DG22 substitutable for the point DG20 by moving the marker MG20 displayed on the touch panel 16. The computer 1 changes the point DG corresponding to the marker MG20 from the point DG20 to the point DG22 by receiving an operation from the user who moves the marker MG20. Further, the user designates the point DP22 substitutable for the point DP20 by moving the marker MP20 displayed on the touch panel 16. The computer 1 changes the point DP corresponding to the marker MP20 from the point DP20 to the point DP22 by receiving an operation from the user who moves the marker MP20. Further, the computer 1 associates the point DG22 with the point DP22.

Figure 16:
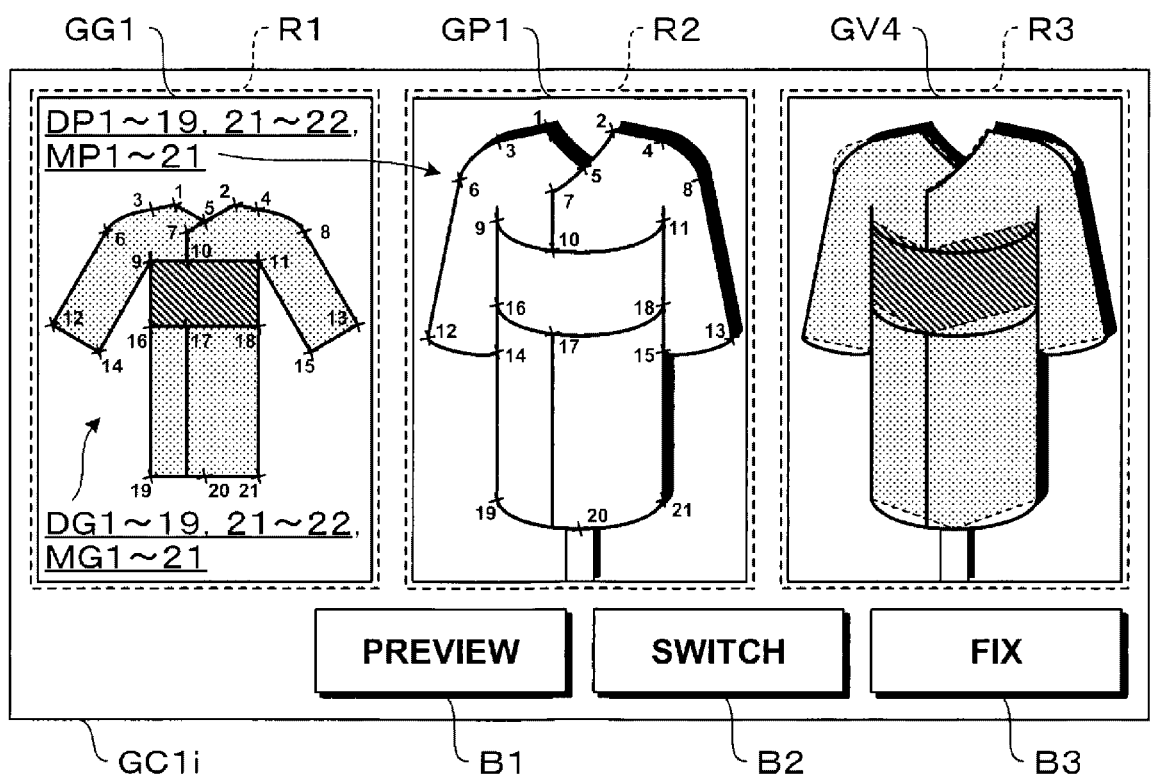
FIG. 16 is an illustrative diagram showing a setting image GC1i.

FIG. 16 is an illustrative diagram showing the setting image GC1*i*. The setting image GC1*i* is an aspect of the setting image GC1.

In a state in which the setting image GC1*h* is displayed on the touch panel 16, the computer 1 changes the setting image GC1 to be displayed on the touch panel 16 from the setting image GC1*h* to the setting image GC1*i* by receiving an operation from the user who touches the button B1. The setting image GC1*i* is similar to the setting image GC1*h* except that the preview image GV4 instead of the preview image GV1 is displayed in the region R3.

Figure 17:
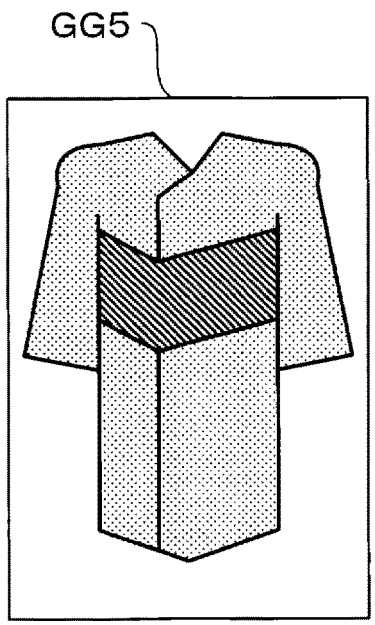
FIG. 17 is a schematic diagram showing an image GG5.

The computer 1 deforms the image GG1 into the image GG5 by receiving an operation from the user who touches the button B1 on the setting image GC1*h*. FIG. 17 is a schematic diagram showing the image GG5. Conversion equations for deforming the image GG1 into the image GG5 are generated based on a correspondence relationship between the points DG1 to DG19, the point DG21 as well as the point DG22 and the points DP1 to DP19, the point DP21 as well as the point DP22.

The computer 1 generates the preview image GV4 by combining the image GG5 and the captured image GP1 after generating the image GG5 by deforming the image GG1. The computer 1 displays the preview image GV4 in the region R3.

Figure 18:
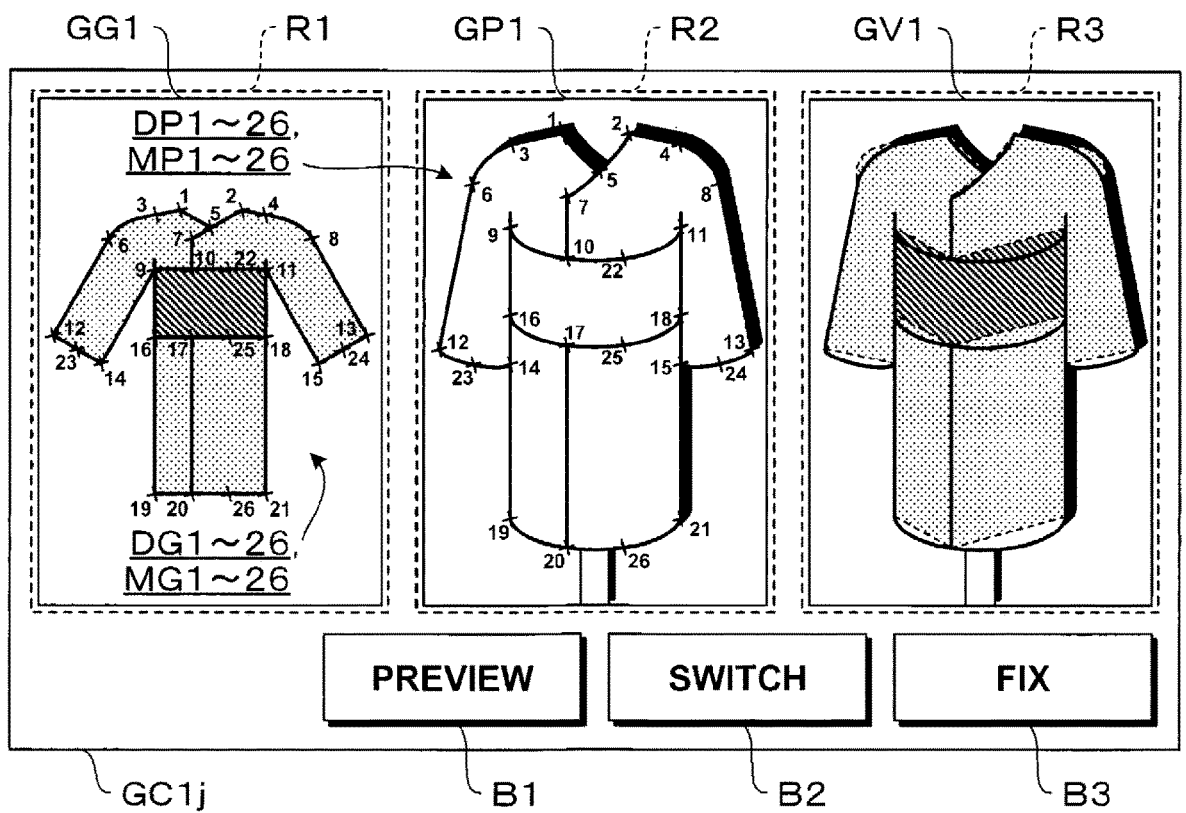
FIG. 18 is an illustrative diagram showing a setting image GC1j.

FIG. 18 is an illustrative diagram showing the setting image GC1*j*. The setting image GC1*j* is an aspect of the setting image GC1.

In a state in which the setting image GC1*c* is displayed on the touch panel 16, the computer 1 changes the setting image GC1 to be displayed on the touch panel 16 from the setting image GC1*c* to the setting image GC1*j* by receiving an operation from the user who designates the points DG22 to DG26 on the image GG1 and an operation from the user who designates the points DP22 to DP26 on the captured image GP1. The setting image GC1*j* is similar to the setting image GC1*c* except that the markers MG22 to MG26 are displayed by being superimposed on the image GG1 and that the markers MP22 to MP26 are displayed by being superimposed on the captured image GP1. In FIG. 18, the point DP*x* is a point corresponding to the point DG*x*. As described above, the value x represents the integer of one or more. For example, the point DP22 corresponds to the point DG22. Further, the point DP26 corresponds to the point DG26.

In the embodiment, the operation of designating the point DG26 on the image GG1 may be referred to as a "sixth operation". Further, the operation of designating the point DP26 on the captured image GP1 may be referred to as a "seventh operation".

For example, when the user checks the preview image GV and determines that the image GG1 is not appropriately deformed, the user can re-deform the image GG1 by designating a new point DG in addition to the point DG designated on the image GG1 and designating a new point DP in addition to the point DP designated on the captured image GP1.

When designating the new point DG, for example, the user designates one or more points DG on the image GG1 as the new points DG by touching the touch panel 16. The computer 1 receives an operation from the user who designates the one or more points DG on the image GG1. Further, the computer 1 displays one or more markers MG corresponding to the one or more designated points DG in a manner of being superimposed on the image GG1.

When designating the new point DP, for example, the user designates one or more points DP on the captured image GP1 as the new points DP by touching the touch panel 16. The computer 1 receives an operation from the user who designates the one or more points DP on the captured image GP1. Further, the computer 1 displays one or more markers MP corresponding to the one or more designated points DP in a manner of being superimposed on the captured image GP1.

The markers MG1 to MG26 for indicating positions of the points DG1 to DG26 are displayed by being superimposed on the image GG1 included in the setting image GC1*j*. In FIG. 18, the marker MG*y* corresponds to the point DG*y*. As described above, the value y represents the integer of one or more. For example, the marker MG22 corresponds to the point DG22. Further, the marker MG26 corresponds to the point DG26. Further, the marker MG*y* includes the cross symbol indicating the position of the point DG*y*, and the number indicating the value y. The number indicating the value y included in the marker MG*y* is displayed in the predetermined range from the point DG*y*.

The markers MP1 to MP26 for indicating positions of the points DP1 to DP26 are displayed by being superimposed on the captured image GP1 included in the setting image GC1*j*. In FIG. 18, the marker MP*z* corresponds to the point DP*z*. As described above, the value z represents the integer of one or more. For example, the marker MP22 corresponds to the point DP22. Further, the marker MP26 corresponds to the point DP26. Further, the marker MP*z* includes the cross symbol indicating the position of the point DP*z* and the number indicating the value z. The number indicating the value z included in the marker MP*z* is displayed in the predetermined range from the point DP*z*.

Figure 19:
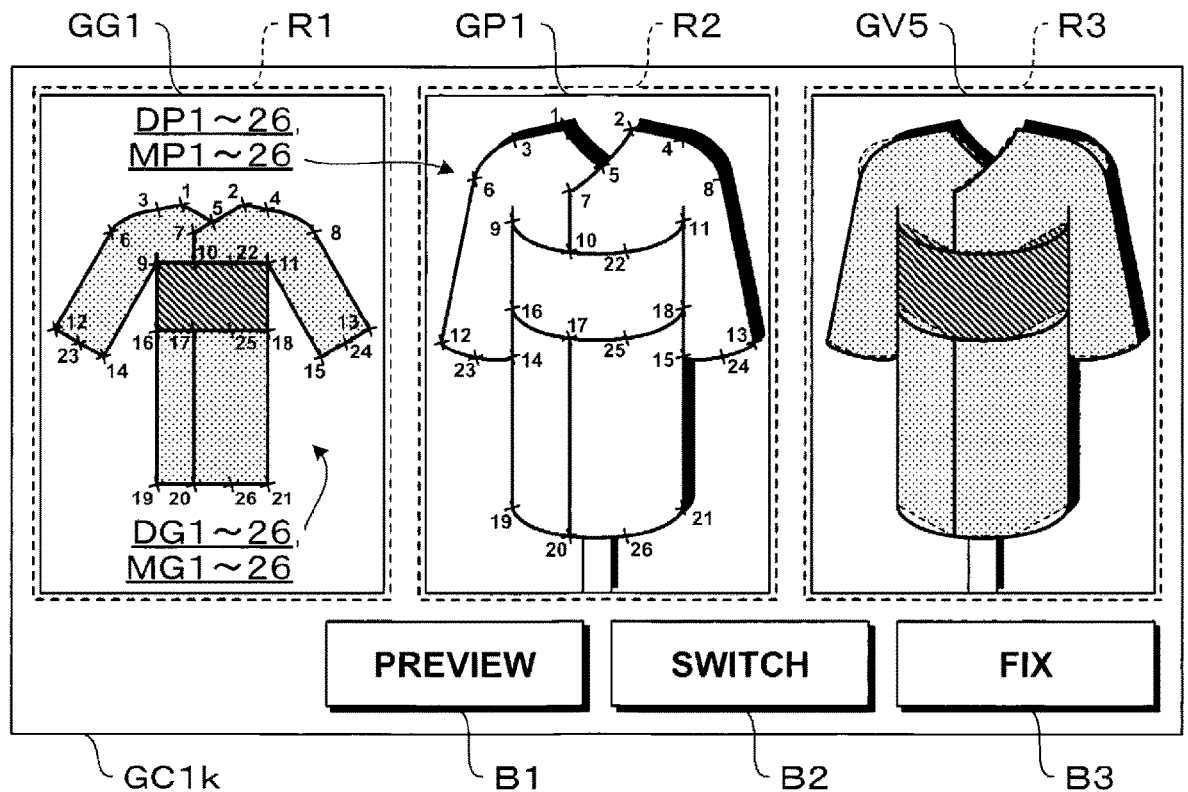
FIG. 19 is an illustrative diagram showing a setting image GC1k.

FIG. 19 is an illustrative diagram showing the setting image GC1*k*. The setting image GC1*k* is an aspect of the setting image GC1.

In a state in which the setting image GC1*j* is displayed on the touch panel 16, the computer 1 changes the setting image GC1 to be displayed on the touch panel 16 from the setting image GC1*j* to the setting image GC1*k* by receiving an operation from the user who touches the button B1. The setting image GC1$k$ is similar to the setting image GC1$j$ except that the preview image GV5 instead of the preview image GV1 is displayed in the region R3.

Figure 20:
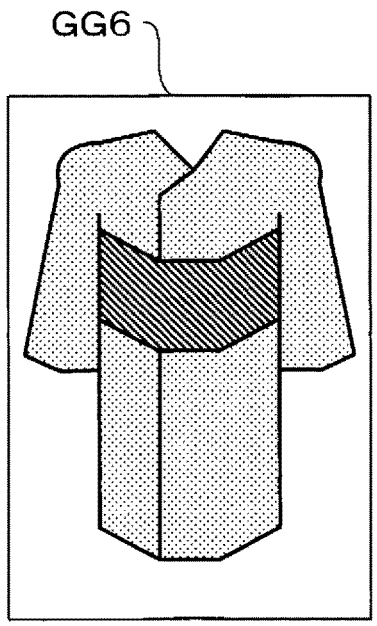
FIG. 20 is a schematic diagram showing an image GG6.

The computer 1 deforms the image GG1 into the image GG6 by receiving an operation from the user who touches the button B1 on the setting image GC1$j$. FIG. 20 is a schematic diagram showing the image GG6. Conversion equations for deforming the image GG1 into the image GG6 are generated based on a correspondence relationship between the points DG1 to DG26 and the points DP1 to DP26.

The computer 1 generates the preview image GV5 by combining the image GG6 and the captured image GP1 after generating the image GG6 by deforming the image GG1. The computer 1 displays the preview image GV5 in the region R3.

Figure 21:
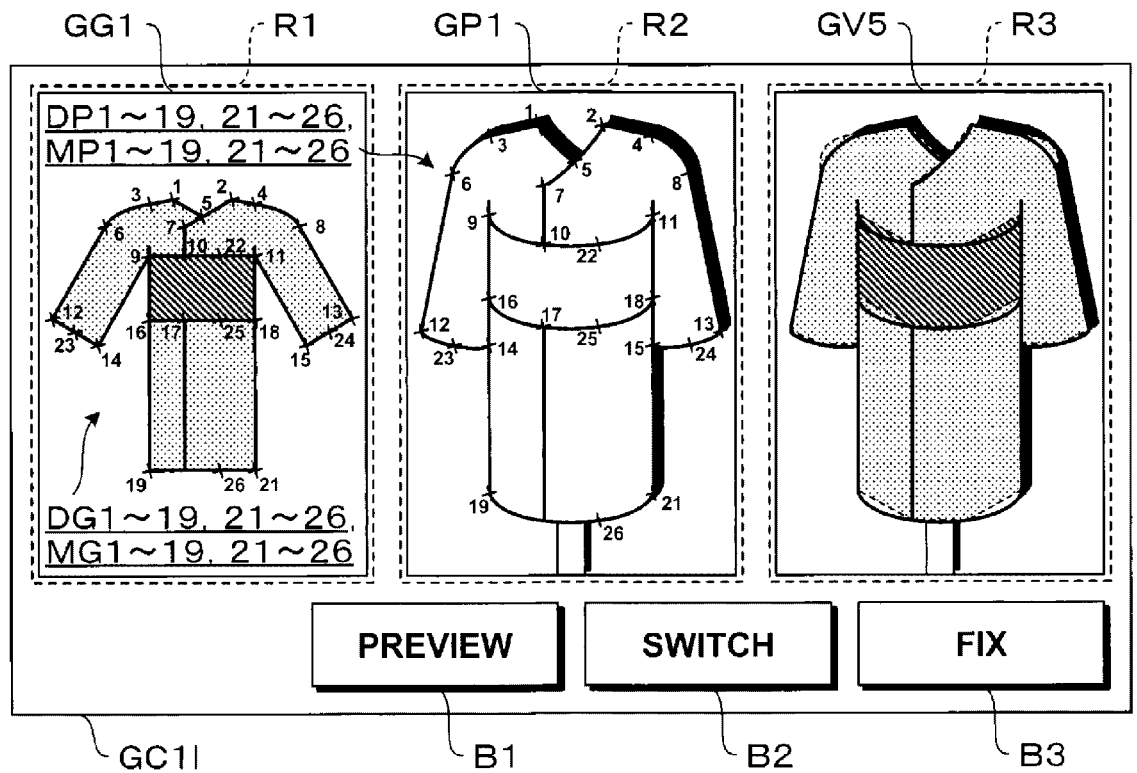
FIG. 21 is an illustrative diagram showing a setting image GC1l.

FIG. 21 is an illustrative diagram showing the setting image GC11. The setting image GC11 is an aspect of the setting image GC1.

In a state in which the setting image GC1$k$ is displayed on the touch panel 16, the computer 1 changes the setting image GC1 to be displayed on the touch panel 16 from the setting image GC1$k$ to the setting image GC11 by receiving an operation from the user who cancels designation of the point DG20 on the image GG1 or the point DP20 on the captured image GP1. The setting image GC11 is similar to the setting image GC1$k$ except that the marker MG20 is not displayed and that the marker MP20 is not displayed.

For example, when the user checks the preview image GV and determines that the image GG1 is not appropriately deformed, the user can re-deform the image GG1 by canceling the designation of the point DG designated on the image GG1 or the point DP designated on the captured image GP1.

When canceling the designation of the point DG designated on the image GG1, for example, the user performs an operation of erasing the marker MG corresponding to the designated point DG. The computer 1 cancels the designation of the point DG corresponding to the marker MG by receiving an operation from the user who erases the marker MG. The operation of erasing the marker MG may be, for example, an operation of double-tapping the marker MG to be erased, an operation of long-pressing the marker MG to be erased for a predetermined time or more, or the like.

When the designation of the point DP designated on the captured image GP1 is canceled, for example, the user performs an operation of erasing the marker MP corresponding to the designated point DP. The computer 1 cancels the designation of the point DP corresponding to the marker MP by receiving an operation from the user who erases the marker MP. The operation of erasing the marker MP may be, for example, an operation of double-tapping the marker MP to be erased, an operation of long-pressing the marker MP to be erased for a predetermined time or more, or the like.

In the embodiment, it is assumed that when one of the marker MG and the marker MP in the correspondence relationship is erased, the other of the marker MG and the marker MP is also erased. That is, when the designation of one of the point DG and the point DP in the correspondence relationship is canceled, the designation of the other of the point DG and the point DP is also canceled.

The user performs an operation of erasing the marker MG20 or the marker MP20 displayed on the touch panel 16. The computer 1 cancels the designation of the point DG20 and the point DP20 by receiving an operation from the user who erases the marker MG20 or the marker MP20.

In the embodiment, the operation of canceling the designation of the point DG20 or the point DP20 may be referred to as an "eighth operation".

Figure 22:
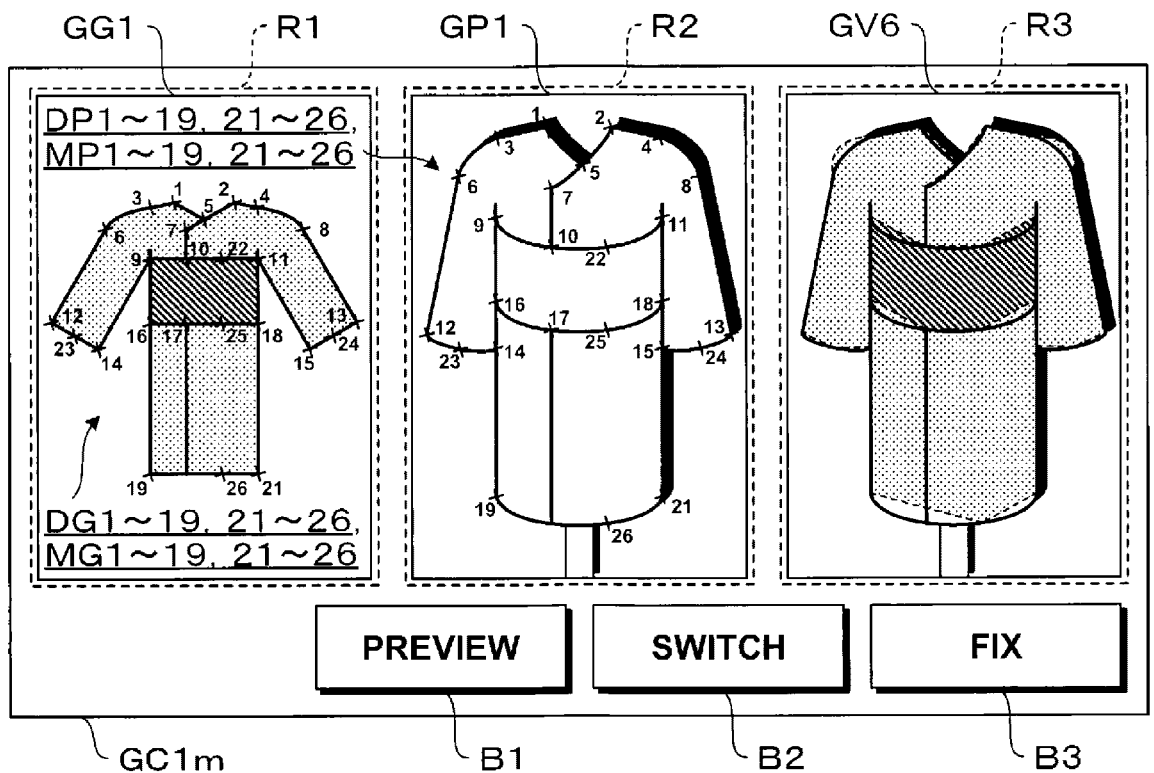
FIG. 22 is an illustrative diagram showing a setting image GC1m.

FIG. 22 is an illustrative diagram showing the setting image GC1$m$. The setting image GC1$m$ is an aspect of the setting image GC1.

In a state in which the setting image GC11 is displayed on the touch panel 16, the computer 1 changes the setting image GC1 to be displayed on the touch panel 16 from the setting image GC11 to the setting image GC1$m$ by receiving an operation from the user who touches the button B1. The setting image GC1$m$ is similar to the setting image GC11 except that the preview image GV6 instead of the preview image GV5 is displayed in the region R3.

Figure 23:
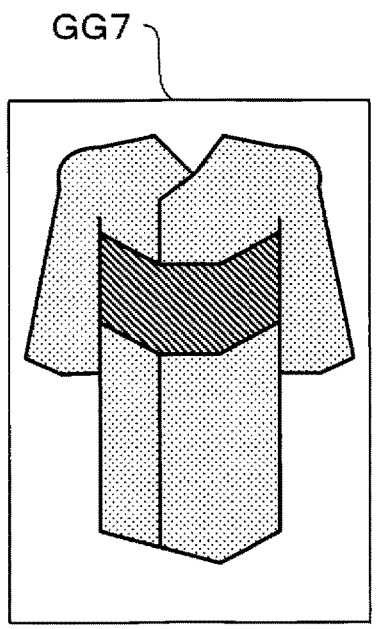
FIG. 23 is a schematic diagram showing an image GG7.

The computer 1 deforms the image GG1 into the image GG7 by receiving an operation from the user who touches the button B1 on the setting image GC11. FIG. 23 is a schematic diagram showing the image GG7. Conversion equations for deforming the image GG1 into the image GG7 are generated based on a correspondence relationship between the points DG1 to DG19 as well as the points DG21 to DG26 and the points DP1 to DP19 as well as the points DP21 to DP26.

The computer 1 generates the preview image GV6 by combining the image GG7 and the captured image GP1 after generating the image GG7 by deforming the image GG1. The computer 1 displays the preview image GV6 in the region R3.

Figure 24:
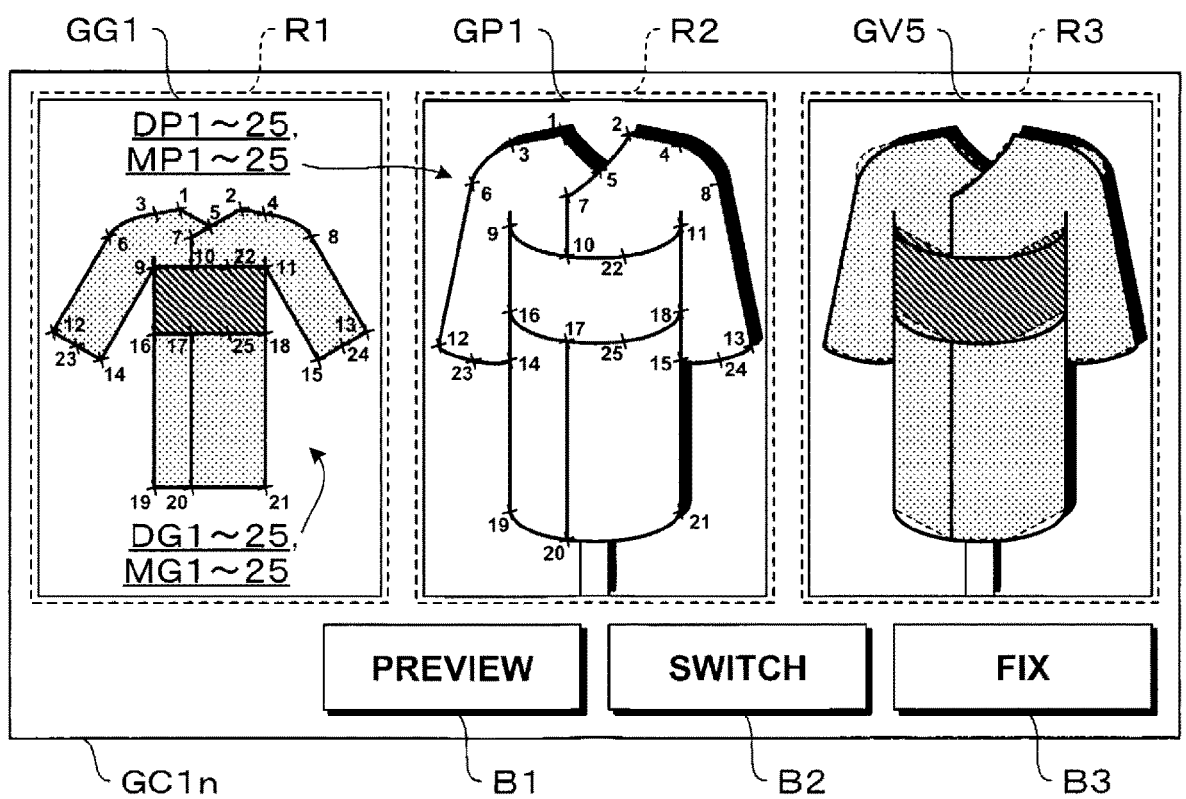
FIG. 24 is an illustrative diagram showing a setting image GC1n.

FIG. 24 is an illustrative diagram showing the setting image GC1$n$. The setting image GC1$n$ is an aspect of the setting image GC1.

In a state in which the setting image GC1$k$ is displayed on the touch panel 16, the computer 1 changes the setting image GC1 to be displayed on the touch panel 16 from the setting image GC1$k$ to the setting image GC1$n$ by receiving an operation from the user who cancels the designation of the point DG26 on the image GG1 or the point DP26 on the captured image GP1. The setting image GC1$n$ is similar to the setting image GC1$k$ except that the marker MG26 is not displayed and that the marker MP26 is not displayed.

The user performs an operation of erasing the marker MG26 or the marker MP26 displayed on the touch panel 16. The computer 1 cancels the designation of the point DG26 and the point DP26 by receiving an operation from the user who erases the marker MG26 or the marker MP26.

In the embodiment, the operation of canceling the designation of the point DG26 or the point DP26 may be referred to as a "ninth operation".

Figure 25:
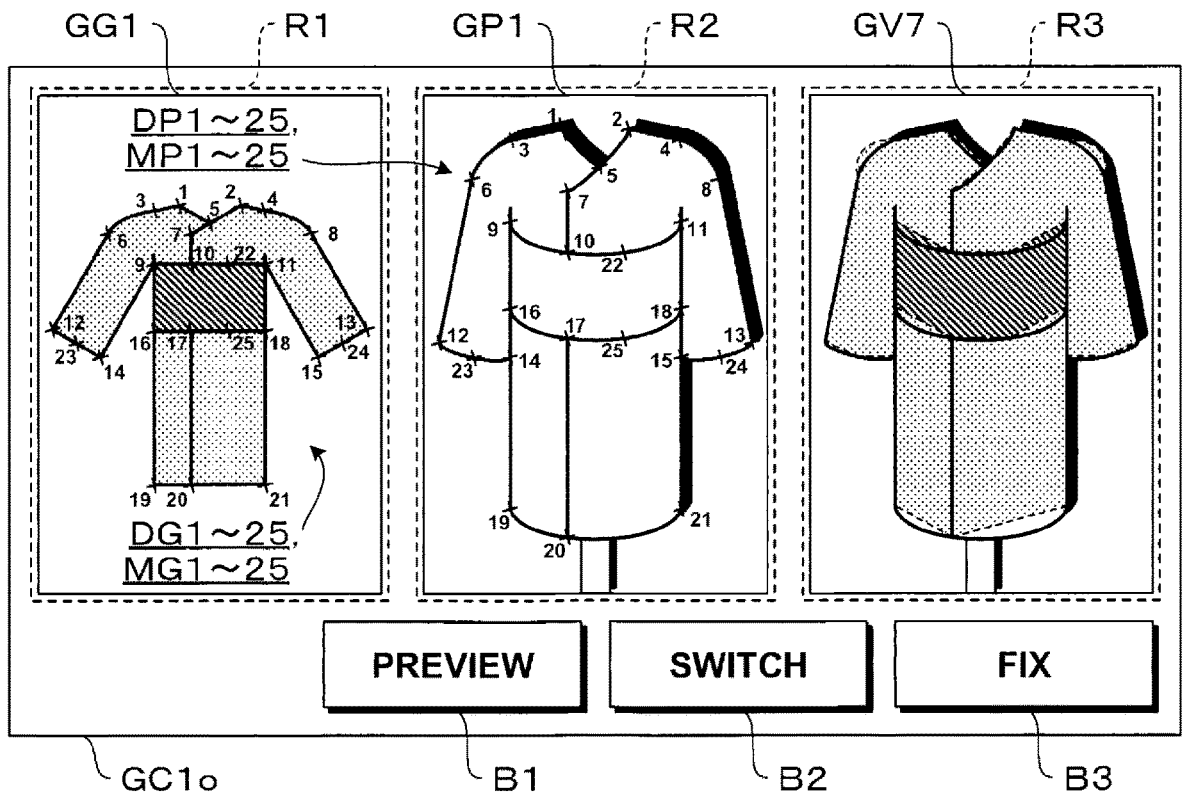
FIG. 25 is an illustrative diagram showing a setting image GC1o.

FIG. 25 is an illustrative diagram showing the setting image GC1$o$. The setting image GC1$o$ is an aspect of the setting image GC1.

In a state in which the setting image GC1$n$ is displayed on the touch panel 16, the computer 1 changes the setting image GC1 to be displayed on the touch panel 16 from the setting image GC1$n$ to the setting image GC1$o$ by receiving an operation from the user who touches the button B1. The setting image GC1$o$ is similar to the setting image GC1$n$ except that the preview image GV7 instead of the preview image GV5 is displayed in the region R3.

Figure 26:
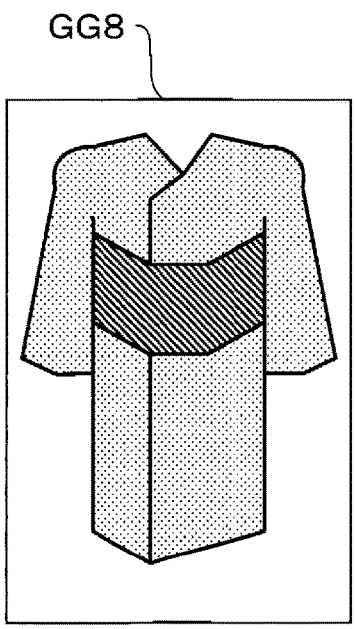
FIG. 26 is a schematic diagram showing an image GG8.

The computer 1 deforms the image GG1 into the image GG8 by receiving an operation from the user who touches the button B1 on the setting image GC1$n$. FIG. 26 is a schematic diagram showing the image GG8. Conversion equations for deforming the image GG1 into the image GG8 are generated based on a correspondence relationship between the points DG1 to DG25 and the points DP1 to DP25.

The computer 1 generates the preview image GV7 by combining the image GG8 and the captured image GP1 after generating the image GG8 by deforming the image GG1. The computer 1 displays the preview image GV7 in the region R3.

Figure 27:
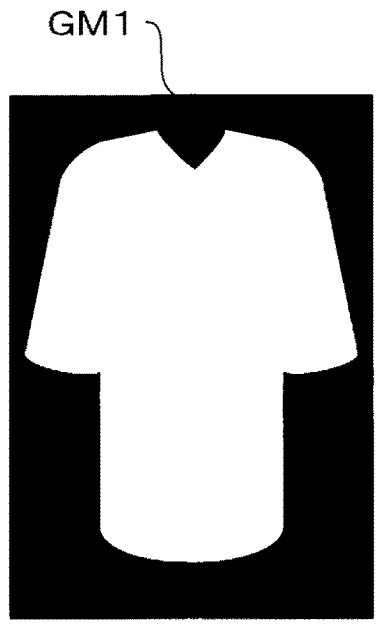
FIG. 27 is a schematic diagram showing a mask image GM1.

FIG. 27 is a schematic diagram showing a mask image GM1. The mask image GM1 is a black-and-white binary image generated based on the captured image GP1. The computer 1 combines a deformed image obtained by deforming the image GG1 and the mask image GM1 using an arithmetic process such as addition, subtraction, multiplication, or division, so that an image including a part of the deformed image can be generated. In the embodiment, the image including a part of the deformed image may be referred to as a "partially deformed image". In other words, the partially deformed image is an image in which a part of the deformed image is extracted based on the mask image GM1. In the embodiment, a case is assumed in which the computer 1 generates the partially deformed image along with the generation of the deformed image. Further, a case is assumed in which the computer 1 generates the preview image GV including the partially deformed image along with the generation of the preview image GV including the deformed image.

Figure 28:
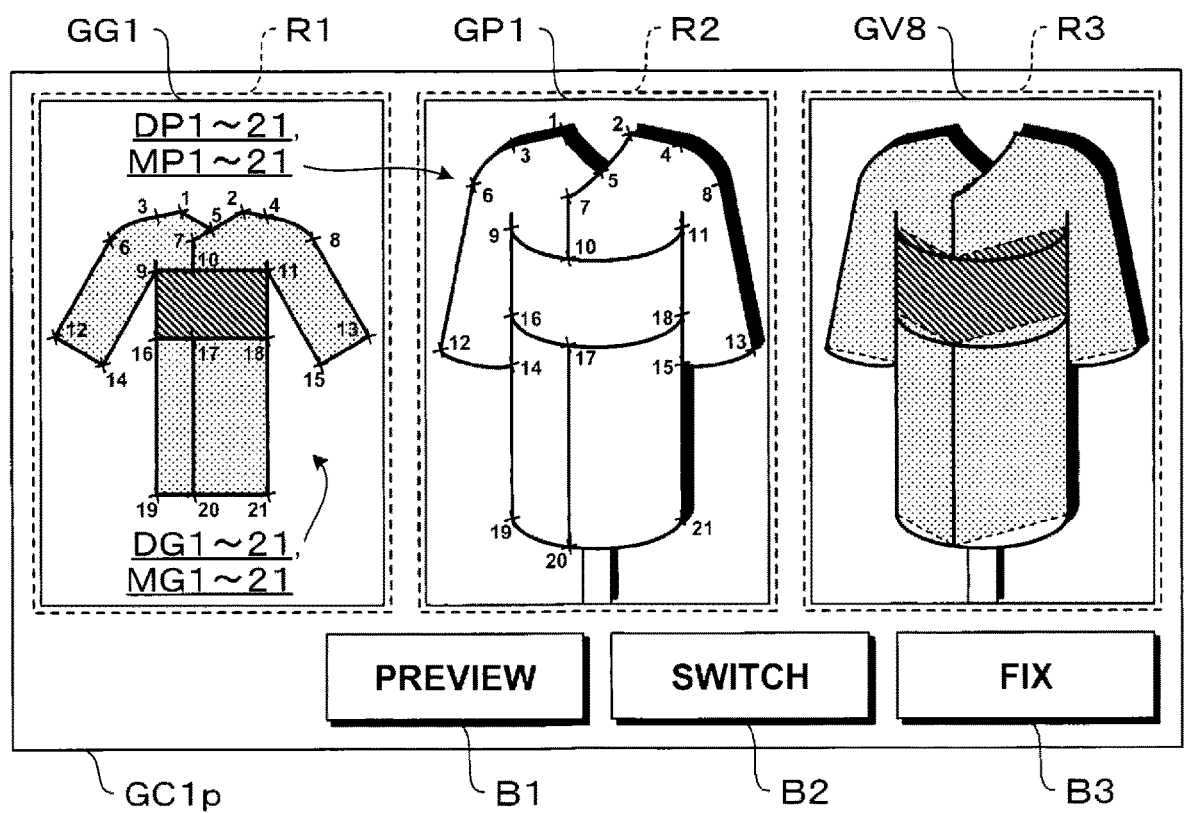
FIG. 28 is an illustrative diagram showing a setting image GC1$p$.

FIG. 28 is an illustrative diagram showing the setting image GC1p. The setting image GC1p is an aspect of the setting image GC1.

In a state in which the setting image GC1c is displayed on the touch panel 16, the computer 1 changes the setting image GC1 to be displayed on the touch panel 16 from the setting image GC1c to the setting image GC1p by receiving an operation from the user who touches the button B2. The setting image GC1p is similar to the setting image GC1c except that the preview image GV8 instead of the preview image GV1 is displayed in the region R3.

Figure 29:
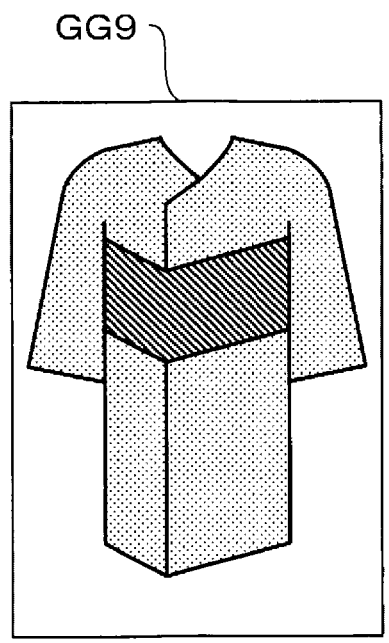
FIG. 29 is a schematic diagram showing an image GG9.

The button B2 is a button for the user to instruct the computer 1 to switch between displaying the preview image GV including the deformed image and displaying the preview image GV including the partially deformed image on the touch panel 16. The user instructs the computer 1 to switch the preview image GV by touching the button B2 displayed on the touch panel 16. In other words, the operation of touching the button B2 is an operation of designating whether the preview image GV displayed in the region R3 includes the deformed image or the partially deformed image. The computer 1 switches between displaying the preview image GV1 including the image GG2 that is the deformed image and displaying the preview image GV8 including the image GG9 that is the partially deformed image on the touch panel 16 according to an operation from the user who touches the button B2 on the setting image GC1c. In other words, the computer 1 switches whether the preview image GV includes the image GG2 that is the deformed image or the image GG9 that is the partially deformed image according to the operation from the user who touches the button B2 on the setting image GC1c. FIG. 29 is a schematic diagram showing the image GG9. The image GG9 is generated by combining the image GG2 and the mask image GM1.

In the embodiment, the operation of designating whether the preview image GV includes the deformed image or the partially deformed image by touching the button B2 may be referred to as a "tenth operation".

When the user checks the preview image GV and determines that the image GG1 is appropriately deformed, the user can end the process related to the deformation of the image GG1 by touching the button B3 displayed on the touch panel 16. The button B3 is a button for the user to instruct the computer 1 to complete the deformation process of the image GG1. The computer 1 completes the process related to the deformation of the image GG1 by receiving an operation from the user who touches the button B3 on the setting image GC1. Further, the computer 1 converts the deformed image such that the generated deformed image is displayed in a predetermined range in the projection region RS and on the torso 3. The computer 1 outputs the converted deformed image to the projector 7. The projector 7 displays the projection image GS including the deformed image by projecting projection light corresponding to the converted deformed image onto the projection region RS and the torso 3.

1.3. Configuration and Functions of Computer

Hereinafter, a configuration and functions of the computer 1 according to the first embodiment will be described with reference to FIGS. 30 and 31.

Figure 30:
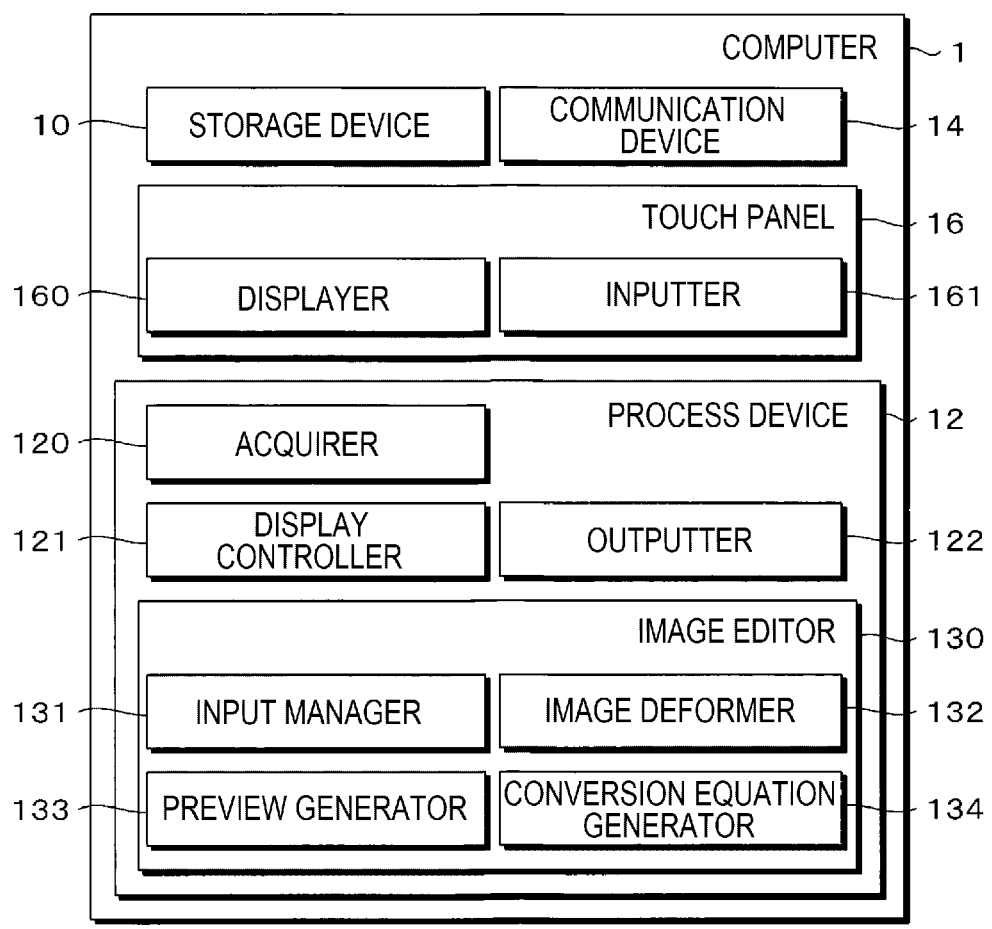
FIG. 30 is a block diagram showing a configuration of a computer 1 according to a first embodiment.

FIG. 30 is a block diagram showing the configuration of the computer 1 according to the first embodiment. The computer 1 includes a storage device 10 that stores various pieces of information, a process device 12 that controls an operation of the computer 1, a communication device 14 that communicates with the camera 5, the projector 7, an external storage device, the external server, or the like, and the touch panel 16 that displays the setting image GC1 and that receives an operation from the user. The process device 12 has functions serving as an acquirer 120, a display controller 121, an outputter 122, and an image editor 130. Further, the image editor 130 has functions serving as an input manager 131, an image deformer 132, a preview generator 133, and a conversion equation generator 134. The touch panel 16 includes a displayer 160 and an inputter 161.

The storage device 10 includes, for example, a volatile memory such as a RAM and a non-volatile memory such as a ROM. Here, the RAM is an abbreviation for a random access memory. Further, the ROM is an abbreviation for a read only memory.

Figure 31:
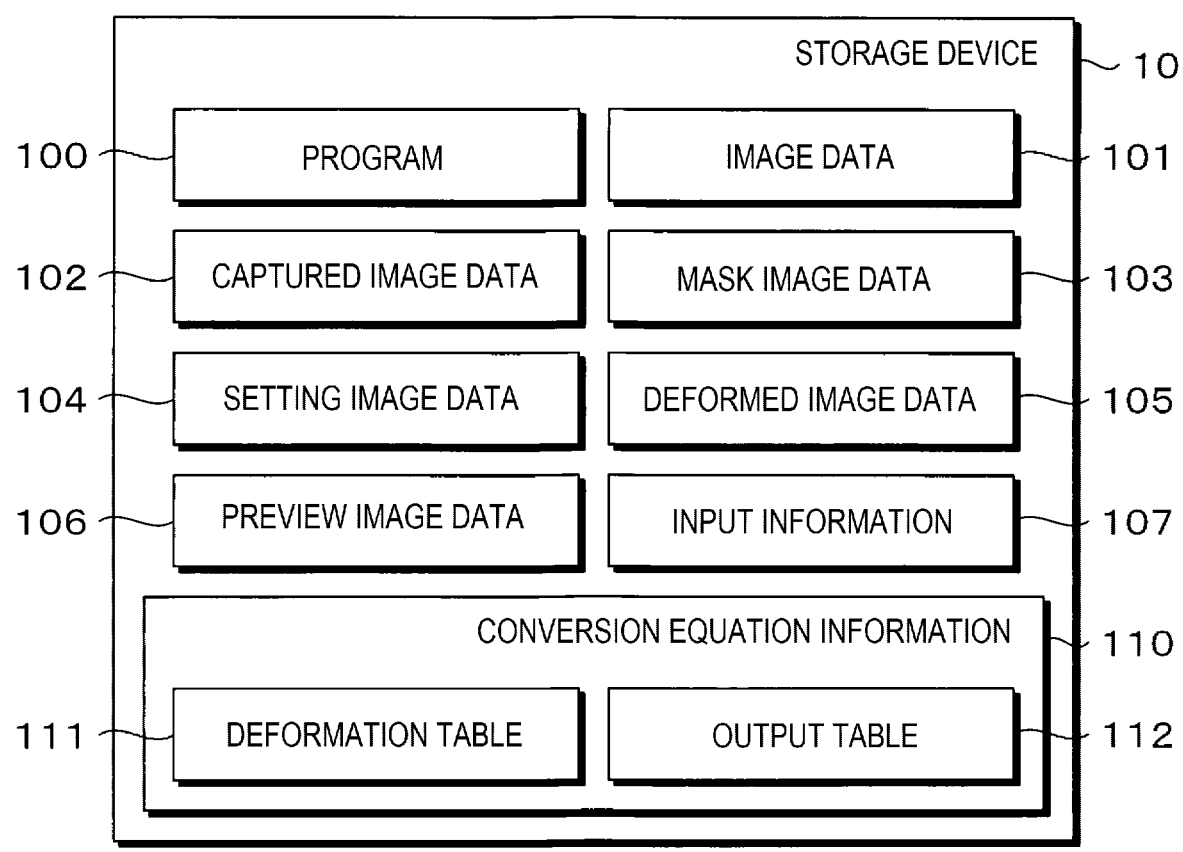
FIG. 31 is a block diagram showing a configuration of a storage device 10 according to the first embodiment.

FIG. 31 is a block diagram showing a configuration of the storage device 10 according to the first embodiment. The non-volatile memory provided in the storage device 10 stores a program 100 defining the operation of the computer 1, image data 101 representing the image GG1, captured image data 102 representing the captured image GP1, mask image data 103 representing the mask image GM1, setting image data 104 representing the setting image GC1, deformed image data 105 representing the deformed image and the partially deformed image, preview image data 106 representing the preview image GV, input information 107 representing content of an operation received from the user, and conversion equation information 110 representing conversion equations used when deforming an image. The input information 107 includes information on a correspondence relationship between the point DG and the point DP. The conversion equation information 110 includes a deformation table 111 and an output table 112. The deformation table 111 represents the conversion equations for deforming the image GG1 into the deformed image. The output table 112 represents a conversion equation for converting the deformed image such that the deformed image included in the projection image GS is displayed in the predetermined range in the projection region RS and on the torso 3.

The output table 112 is generated based on a plurality of captured images acquired by the camera 5 capturing a plurality of black-and-white pattern images displayed by the projector 7 projecting the projection light onto the projection region RS and the torso 3. Different pattern images are recorded in the plurality of captured images. The number of the pattern images displayed by the projector 7 is determined based on resolution (specifically, the number of digits when the resolution is expressed in binary) of an optical modulator such as a liquid crystal panel provided in the projector 7. For example, when the projector 7 includes the liquid crystal panel and the resolution of the liquid crystal panel is 120×90, since each of "120" and "90" is expressed in a 7-digit binary, seven images for expressing coordinates in a horizontal direction and seven images for expressing coordinates in a vertical direction are required. Further, in order to prevent a decrease in imaging accuracy due to an influence of disturbance light such as illumination, it is preferable to use complementary patterns in which black and white of the pattern image is reversed in combination. That is, when the resolution of the liquid crystal panel provided in the projector 7 is 120×90, the output table 112 is generated based on twenty-eight captured images obtained by capturing a total of twenty-eight pattern images. The color arrangement of the pattern image is not limited to the black and white, and may be, for example, two colors including red and green. It is preferable to use two colors having high contrast as the pattern image.

The volatile memory provided in the storage device 10 is used by the process device 12 as a work area when executing the program 100.

A part or all of the storage device 10 may be provided in the external storage device, the external server, or the like. Further, a part or all of the various pieces of information stored in the storage device 10 may be stored in the storage device 10 in advance, or may be acquired from the external storage device, the external server, or the like.

The process device 12 includes one or more CPUs. However, the process device 12 may include a programmable logic device such as an FPGA instead of the CPU or in addition to the CPU. Here, the CPU is an abbreviation for a central processing unit, and the FPGA is an abbreviation for a field-programmable gate array.

The process device 12 functions as the acquirer 120, the display controller 121, the outputter 122, and the image editor 130 shown in FIG. 30 by the CPU or the like provided in the process device 12 executing the program 100 and operating according to the program 100.

The acquirer 120 controls the communication device 14 to acquire the various pieces of information from an external terminal such as the camera 5, the projector 7, the external storage device, or the external server communicably connected to the computer 1. Further, the acquirer 120 causes the storage device 10 to store the acquired various pieces of information. In the embodiment, the acquirer 120 acquires the image data 101, the captured image data 102, and the mask image data 103. The acquirer 120 causes the storage device 10 to store the acquired image data 101, captured image data 102, and mask image data 103.

In the embodiment, a case is assumed in which the image data 101 and the mask image data 103 are acquired from the external server (not shown), and the captured image data 102 is acquired from the camera 5. The external server acquires the captured image data 102 from the camera 5, and generates the mask image GM1 based on the captured image GP1 indicated by the captured image data 102.

The display controller 121 causes the setting image GC1 to be displayed by controlling the displayer 160 provided in the touch panel 16. Further, the display controller 121 causes the marker MG to be displayed in a manner of being superimposed on the image GG1 displayed in the region R1 of the setting image GC1 according to an operation from the user. Further, the display controller 121 causes the marker MP to be displayed in a manner of being superimposed on the captured image GP1 displayed in the region R2 of the setting image GC1 according to an operation from the user. Further, the display controller 121 causes the displayed marker MG and marker MP to be erased according to an operation from the user. Further, the display controller 121 causes the displayed marker MG and marker MP to be moved according to an operation from the user. That is, the display controller 121 causes the marker MG and the marker MP to be displayed at positions different from original positions according to an operation from the user. Further, the display controller 121 causes the preview image GV to be displayed in the region R3 of the setting image GC1 according to an operation from the user.

The image editor 130 executes various processes related to the deformation of the image GG1. Specifically, the image editor 130 functions as the input manager 131, the image deformer 132, the preview generator 133, and the conversion equation generator 134.

The input manager 131 manages the input information 107 representing content of an operation received from the user. Specifically, the input manager 131 acquires the input information 107 representing content of the operation received from the user by controlling the inputter 161 provided in the touch panel 16. Further, the input manager 131 causes the storage device 10 to store the acquired input information 107. Further, when the computer 1 receives a new input operation from the user, the input manager 131 updates the input information 107 stored in the storage device 10. Further, the input manager 131 performs various determinations related to the operation received from the user.

The conversion equation generator 134 generates the deformation table 111 based on a correspondence relationship between the one or more designated points DG and the one or more designated points DP. The deformation table 111 represents a plurality of conversion equations for deforming the image GG1 into the deformed image. Further, the conversion equation generator 134 causes the storage device 10 to store the generated deformation table 111.

The image deformer 132 deforms the image GG1 into the deformed image based on the conversion equations shown in the deformation table 111. Further, the image deformer 132 generates the partially deformed image by combining the deformed image and the mask image GM1. In other words, the image deformer 132 generates the deformed image data 105 representing the deformed image and the partially deformed image based on the deformation table 111, the image data 101 representing the image GG1, and the mask image data 103 representing the mask image GM1. Further, the image deformer 132 causes the storage device 10 to store the generated deformed image data 105.

The preview generator 133 generates the preview image GV obtained by combining the deformed image and the captured image GP1. Further, the preview generator 133 generates the preview image GV obtained by combining the partially deformed image and the captured image GP1. In other words, the preview generator 133 generates the preview image data 106 based on the deformed image data 105 representing the deformed image and the partially deformed image and the captured image data 102 representing the captured image GP1. Further, the preview generator 133 causes the storage device 10 to store the generated preview image data 106.

The outputter 122 converts the deformed image based on the output table 112. The outputter 122 outputs the converted deformed image to the projector 7 by controlling the communication device 14.

The communication device 14 includes, for example, an interface board including a connector and an interface circuit, and has a function of receiving the various pieces of information from the camera 5, the projector 7, the external storage device, the external server, or the like, and a function of transmitting the various pieces of information to the camera 5, the projector 7, the external storage device, the external server, or the like. In the embodiment, a case is assumed in which the communication device 14 is communicably connected to the camera 5, the projector 7, and the external server (not shown), and transmits and receives the various pieces of information. When transmitting and receiving the various pieces of information to and from the camera 5, the projector 7, the external server, or the like using wireless communication, the communication device 14 includes an antenna for performing wireless communication conforming to a predetermined wireless communication standard.

The touch panel 16 is a device in which the displayer 160 that displays an image and the inputter 161 that receives the input operation from the user are integrated. The displayer 160 includes, for example, a liquid crystal panel, an organic EL panel, or the like, and displays the setting image GC1 under control of the display controller 121. Here, the organic EL is an abbreviation for organic electro-luminescence. The inputter 161 includes, for example, a transparent sheet-shaped contact sensor. The inputter 161 covers the displayer 160. The inputter 161 detects a touched position using an electrostatic capacitance specified by an object in contact with the inputter 161 and the inputter 161, and outputs data indicating the detected touched position to the process device 12. The data indicating the touched position is stored in the storage device 10 as the input information 107.

1.4. Operations of Computer

Figure 32:
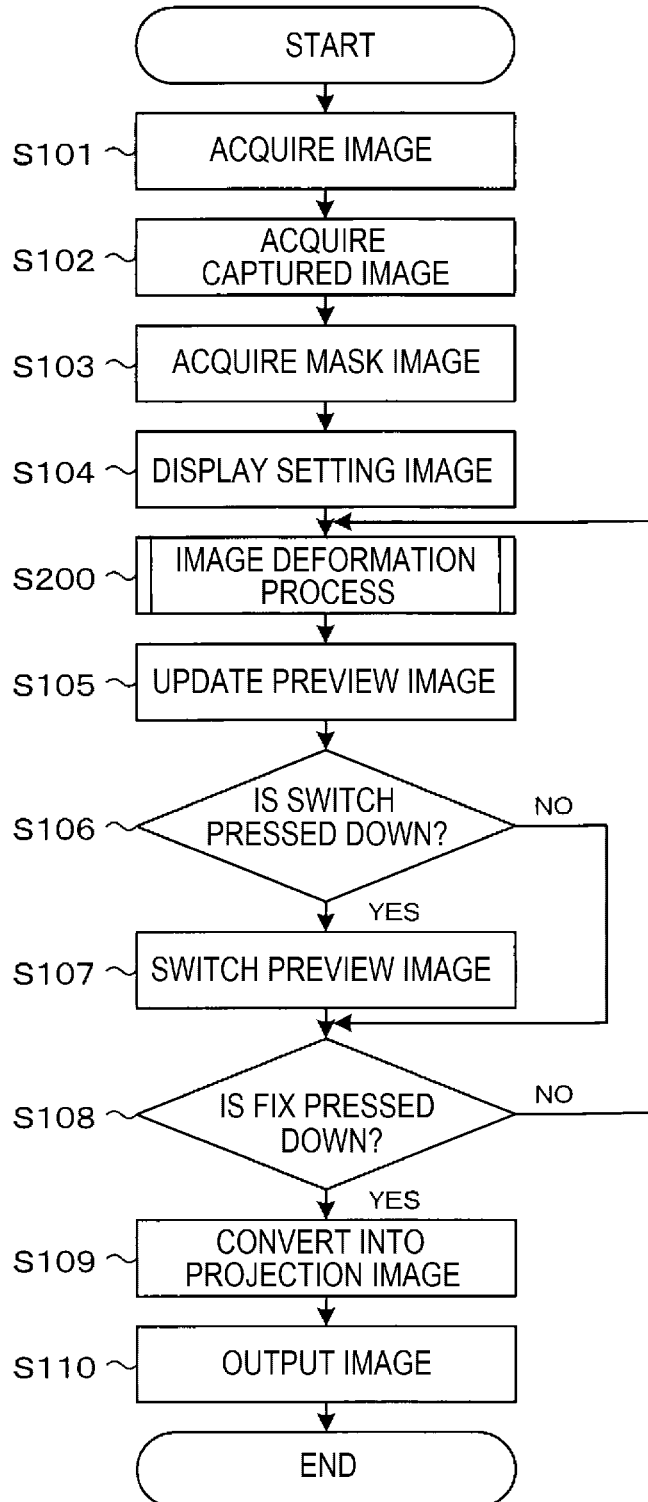
FIG. 32 is a flowchart illustrating operations of the computer 1 according to the first embodiment.

Hereinafter, the operations of the computer 1 according to the first embodiment will be described with reference to FIGS. 32 and 33. FIG. 32 is a flowchart illustrating the operations of the computer 1 according to the first embodiment. A series of operations shown in the flowchart are started when, for example, a power supply of the computer 1 is turned on and the touch panel 16 receives an input operation related to operation start from the user of the computer 1.

In step S101, the acquirer 120 acquires the image data 101 representing the image GG1 from the external server communicably connected to the computer 1 by controlling the communication device 14. Further, the acquirer 120 causes the storage device 10 to store the acquired image data 101.

In step S102, the acquirer 120 acquires the captured image data 102 representing the captured image GP1 from the camera 5 communicably connected to the computer 1 by controlling the communication device 14. Further, the acquirer 120 causes the storage device 10 to store the acquired captured image data 102.

In step S103, the acquirer 120 acquires the mask image data 103 representing the mask image GM1 from the external server communicably connected to the computer 1 by controlling the communication device 14. Further, the acquirer 120 causes the storage device 10 to store the acquired mask image data 103.

In step S104, the display controller 121 causes the setting image GC1 indicated by the setting image data 104 to be displayed by controlling the displayer 160 provided in the touch panel 16. Specifically, the display controller 121 causes the setting image GC1a to be displayed by controlling the displayer 160.

After the process in step S104 is executed, the process device 12 executes the image deformation process in step S200. Further, after the process in step S200 is executed, the process device 12 advances the process to step S105.

Figure 33:
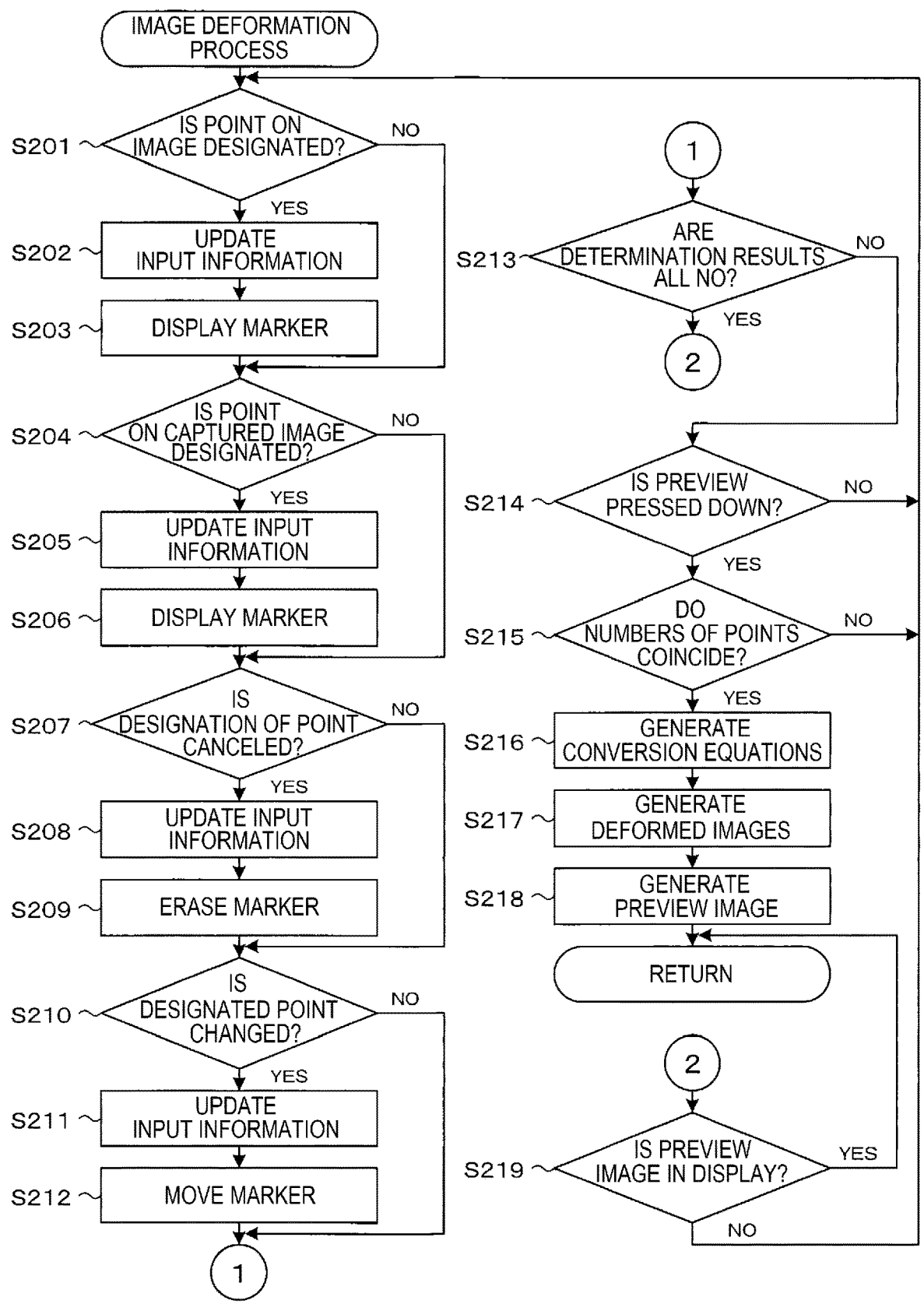
FIG. 33 is a flowchart illustrating an image deformation process of the computer 1 according to the first embodiment.

FIG. 33 is a flowchart illustrating the image deformation process of the computer 1 according to the first embodiment. The flowchart shows a series of operations in the image deformation process in step S200.

In step S201, the input manager 131 determines whether the inputter 161 receives an operation from the user who designates the point DG on the image GG1. In other words, the input manager 131 determines whether the input information 107 representing content of an operation of designating the point DG on the image GG1 is acquired. When the input information 107 representing the content of the operation of designating the point DG on the image GG1 is acquired, that is, when the determination result of step S201 is YES, the input manager 131 advances the process to step S202. Further, when the input information 107 representing the content of the operation of designating the point DG on the image GG1 is not acquired, that is, when the determination result of step S201 is NO, the input manager 131 advances the process to step S204.

In step S202, the input manager 131 causes the storage device 10 to store the acquired input information 107. When the input information 107 is stored in the storage device 10, the input manager 131 updates the input information 107 stored in the storage device 10.

In step S203, the display controller 121 causes the marker MG to be displayed in a manner of being superimposed on the image GG1 based on the input information 107.

In step S204, the input manager 131 determines whether the inputter 161 receives an operation from the user who designates the point DP on the captured image GP1. In other words, the input manager 131 determines whether the input information 107 representing content of an operation of designating the point DP on the captured image GP1 is acquired. When the input information 107 representing the content of the operation of designating the point DP on the captured image GP1 is acquired, that is, when the determination result of step S204 is YES, the input manager 131 advances the process to step S205. Further, when the input information 107 representing the content of the operation of designating the point DP on the captured image GP1 is not acquired, that is, when the determination result of step S204 is NO, the input manager 131 advances the process to step S207.

In step S205, the input manager 131 causes the storage device 10 to store the acquired input information 107. When the input information 107 is stored in the storage device 10, the input manager 131 updates the input information 107 stored in the storage device 10.

In step S206, the display controller 121 causes the marker MP to be displayed in a manner of being superimposed on the captured image GP1 based on the input information 107.

In step S207, the input manager 131 determines whether the inputter 161 receives an operation from the user who cancels the designation of the point DG designated on the image GG1 or the point DP designated on the captured image GP1. In other words, the input manager 131 determines whether the input information 107 representing content of an operation of canceling the designation of the point DG designated on the image GG1 or the point DP designated on the captured image GP1 is acquired. When the input information 107 representing the content of the operation of canceling the designation of the point DG designated on the image GG1 or the point DP designated on the captured image GP1 is acquired, that is, when the determination result of step S207 is YES, the input manager 131 advances the process to step S208. Further, when the input information 107 representing the content of the operation of canceling the designation of the point DG designated on the image GG1 or the point DP designated on the captured image GP1 is not acquired, that is, when the determination result of step S207 is NO, the input manager 131 advances the process to step S210.

In step S208, the input manager 131 updates the input information 107 stored in the storage device 10.

In step S209, the display controller 121 causes the marker MG and the marker MP displayed on the displayer 160 to be erased based on the input information 107.

In step S210, the input manager 131 determines whether the inputter 161 receives an operation from the user who designates the point DG substitutable for the point DG designated on the image GG1 or an operation from the user who designates the point DP substitutable for the point DP designated on the captured image GP1. In other words, the input manager 131 determines whether the input information 107 representing the content of the operation of designating the point DG substitutable for the point DG designated on the image GG1 or the input information 107 representing the content of the operation of designating the point DP substitutable for the point DP designated on the captured image GP1 is acquired. When the input information 107 representing the content of the operation of designating the point DG substitutable for the point DG designated on the image GG1 or the input information 107 representing the content of the operation of designating the point DP substitutable for the point DP designated on the captured image GP1 is acquired, that is, when the determination result of step S210 is YES, the input manager 131 advances the process to step S211. Further, when neither the input information 107 representing the content of the operation of designating the point DG substitutable for the point DG designated on the image GG1 nor the input information 107 representing the content of the operation of designating the point DP substitutable for the point DP designated on the captured image GP1 is acquired, that is, when the determination result of step S210 is NO, the input manager 131 advances the process to step S213.

In step S211, the input manager 131 updates the input information 107 stored in the storage device 10.

In step S212, the display controller 121 causes the marker MG or the marker MP displayed on the displayer 160 to be moved based on the input information 107.

In step S213, the input manager 131 refers to the input information 107, and determines whether the determination results in step S201, step S204, step S207, and step S210 performed most recently are all NO. In other words, the input manager 131 determines whether the input information 107 representing the content of the operation of canceling the designation of the point DG designated on the image GG1 or the point DP designated on the captured image GP1, the input information 107 representing the content of the operation of designating the point DG on the image GG1, the input information 107 representing the content of the operation of designating the point DP on the captured image GP1, the input information 107 representing the content of the operation of designating the point DG substitutable for the point DG designated on the image GG1, or the input information 107 representing the content of the operation of designating the point DP substitutable for the point DP designated on the captured image GP1 is acquired. When none of the input information 107 representing the content of the operation of canceling the designation of the point DG designated on the image GG1 or the point DP designated on the captured image GP1, the input information 107 representing the content of the operation of designating the point DG on the image GG1, the input information 107 representing the content of the operation of designating the point DP on the captured image GP1, the input information 107 representing the content of the operation of designating the point DG substitutable for the point DG designated on the image GG1, and the input information 107 representing the content of the operation of designating the point DP substitutable for the point DP designated on the captured image GP1 is acquired, that is, when the determination result of step S213 is YES, the input manager 131 advances the process to step S219. Further, when the input information 107 representing the content of the operation of canceling the designation of the point DG designated on the image GG1 or the point DP designated on the captured image GP1, the input information 107 representing the content of the operation of designating the point DG on the image GG1, the input information 107 representing the content of the operation of designating the point DP on the captured image GP1, the input information 107 representing the content of the operation of designating the point DG substitutable for the point DG designated on the image GG1, or the input information 107 representing the content of the operation of designating the point DP substitutable for the point DP designated on the captured image GP1 is acquired, that is, when the determination result of step S213 is NO, the input manager 131 advances the process to step S214.

In step S214, the input manager 131 determines whether the inputter 161 receives an operation from the user who touches the button B1. In other words, the input manager 131 determines whether the input information 107 representing content of an operation of instructing the deformation of the image GG1 is acquired. When the input information 107 representing the content of the operation of instructing the deformation of the image GG1 is acquired, that is, when the determination result of step S214 is YES, the input manager 131 advances the process to step S215. Further, when the input information 107 representing the content of the operation of instructing the deformation of the image GG1 is not acquired, that is, when the determination result of step S214 is NO, the input manager 131 advances the process to step S201.

In step S215, the input manager 131 refers to the input information 107, and determines whether the number of points DG and the number of points DP coincide with each other. When the number of points DG and the number of points DP coincide with each other, that is, when the determination result of step S215 is YES, the input manager 131 advances the process to step S216. Further, when the number of points DG and the number of points DP do not coincide with each other, that is, when the determination result of step S215 is NO, the input manager 131 advances the process to step S201.

When the number of point DG and the number of points DP do not coincide with each other, it is preferable that the display controller 121 causes a message that prompts the user to perform an operation for coinciding the number of points DG and the number of points DP with each other to be displayed.

In step S216, the conversion equation generator 134 generates the deformation table 111 based on the input information 107. Further, the conversion equation generator 134 causes the storage device 10 to store the generated deformation table 111.

In step S217, the image deformer 132 generates the deformed image data 105 representing the deformed image and the partially deformed image based on the deformation table 111, the image data 101 representing the image GG1, and the mask image data 103 representing the mask image GM1. Further, the image deformer 132 causes the storage device 10 to store the generated deformed image data 105.

In step S218, the preview generator 133 generates the preview image data 106 based on the deformed image data 105 representing the deformed image and the partially deformed image, and the captured image data 102 representing the captured image GP1. Further, the preview generator 133 causes the storage device 10 to store the generated preview image data 106.

After the process in step S218 is executed, the process device 12 ends the image deformation process shown in the flowchart in FIG. 33.

In step S219, the image editor 130 determines whether the preview image GV is displayed on the displayer 160. When the preview image GV is displayed on the displayer 160, that is, when the determination result of step S219 is YES, the process device 12 including the image editor 130 ends the image deformation process shown in the flowchart in FIG. 33. Further, when the preview image GV is not displayed on the displayer 160, that is, when the determination result of step S219 is NO, the image editor 130 advances the process to step S201.

After the image deformation process shown in the flowchart in FIG. 33 is ended, the process device 12 executes the process in step S105 shown in the flowchart in FIG. 32.

When the preview image GV is not displayed on the displayer 160, that is, when the deformed image is not generated even once, the process device 12 repeats the image deformation process shown in FIG. 33 until the deformed image is generated. Further, when the determination in step S213 is YES and the preview image GV is displayed on the displayer 160, that is, when the deformed image is generated at least once, the process device 12 ends the image deformation process without generating a new deformed image.

In step S105, the display controller 121 causes the preview image GV to be displayed in the region R3 of the setting image GC1. When the preview image GV is displayed in the region R3 of the setting image GC1, the display controller 121 causes the preview image GV to be updated by controlling the displayer 160.

In step S106, the input manager 131 determines whether the inputter 161 receives an operation from the user who touches the button B2. In other words, the input manager 131 determines whether the input information 107 representing content of an operation of instructing switching of the preview image GV is acquired. When the input information 107 representing the content of the operation of instructing the switching of the preview image GV is acquired, that is, when the determination result of step S106 is YES, the input manager 131 advances the process to step S107. Further, when the input information 107 representing the content of the operation of instructing the switching of the preview image GV is not acquired, that is, when the determination result of step S106 is NO, the input manager 131 advances the process to step S108.

In step S107, the display controller 121 switches the preview image GV displayed in the region R3 of the setting image GC1. When the preview image GV including the deformed image is displayed on the displayer 160, the display controller 121 causes the preview image GV including the partially deformed image to be displayed by controlling the displayer 160. Further, when the preview image GV including the partially deformed image is displayed on the displayer 160, the display controller 121 causes the preview image GV including the deformed image to be displayed by controlling the displayer 160.

In step S108, the input manager 131 determines whether the inputter 161 receives an operation from the user who touches the button B3. In other words, the input manager 131 determines whether the input information 107 representing content of an operation of instructing completion of the image deformation process is acquired. When the input information 107 representing the content of the operation of instructing the completion of the image deformation process is acquired, that is, when the determination result of step S108 is YES, the input manager 131 advances the process to step S109. Further, when the input information 107 representing the content of the operation of instructing the completion of the image deformation process is not acquired, that is, when the determination result of step S108 is NO, the input manager 131 advances the process to step S200.

Until the determination in step S108 is YES, that is, until the operation of instructing the completion of the image deformation process is received, the process device 12 executes the image deformation process in step S200 again.

In step S109, the outputter 122 converts the deformed image based on the output table 112.

In step S110, the outputter 122 outputs the converted deformed image to the projector 7 by controlling the communication device 14.

After the process in step S110 is executed, the process device 12 ends the series of operations shown in the flowchart in FIG. 32.

As described above, according to the first embodiment, the computer 1 can cause the touch panel 16 to display the setting image GC1 in which the image GG1 to be deformed, the captured image GP1 referred to during the deformation, and the preview image GV including the deformed image GG1 are displayed side by side. That is, the user can compare the image before the deformation with the image after the deformation by viewing.

According to the first embodiment, the computer 1 can deform the image GG1 based on the correspondence relationship between the one or more points DG designated on the image GG1 and the one or more points DP designated on the captured image GP1. That is, the user can deform the shape of the image GG1 according to the captured image GP1 by designating the point DP according to the captured image GP1 and designating the point DG corresponding to the point DP on the image GG1.

According to the first embodiment, the computer 1 can generate the partially deformed image by extracting a part of the deformed image using the mask image GM1. That is, the computer 1 can adjust the shape of the deformed image by removing an unnecessary portion of the deformed image using the mask image GM1.

As described above, the image display method according to the first embodiment includes: acquiring the image GG1; acquiring the captured image GP1 obtained by imaging the torso 3; and displaying the setting image GC1 including the region R1 in which the image GG1 is displayed, the region R2 in which the captured image GP1 is displayed, and the region R3 in which the preview image GV including at least a part of the deformed image obtained by deforming the image GG1 according to the image of the torso 3 included in the captured image GP1 is displayed.

The computer 1 according to the first embodiment includes the one or more CPUs, and the one or more CPUs acquire the image GG1, acquire the captured image GP1 obtained by imaging the torso 3, and cause the touch panel 16 to display the setting image GC1 including the region R1 in which the image GG1 is displayed, the region R2 in which the captured image GP1 is displayed, and the region R3 in which the preview image GV including at least a part of the deformed image obtained by deforming the image GG1 according to the image of the torso 3 included in the captured image GP1 is displayed.

The program 100 according to the first embodiment causes the CPU to acquire the image GG1, acquire the captured image GP1 obtained by imaging the torso 3, and cause the touch panel 16 to display the setting image GC1 including the region R1 in which the image GG1 is displayed, the region R2 in which the captured image GP1 is displayed, and the region R3 in which the preview image GV including at least a part of the deformed image obtained by deforming the image GG1 according to the image of the torso 3 included in the captured image GP1 is displayed.

That is, the computer 1 according to the embodiment can simultaneously display the image GG1 that is the image before the deformation, and the preview image GV including the deformed image obtained by deforming the image GG1. Accordingly, the user can accurately check whether an image is appropriately deformed into a desired shape by comparing images before and after deformation.

In the first embodiment, the computer 1 is an example of the "information processing apparatus", the touch panel 16 is an example of the "display device", the program 100 is an example of the "program", the image GG1 is an example of the "first image", the torso 3 is an example of the "projection receiving object of the projection light", the captured image GP1 is an example of the "captured image", the region R1 is an example of the "first region", the region R2 is an example of the "second region", the region R3 is an example of the "third region", the setting image GC1 is an example of the "setting image", the preview image GV is an example of the "preview image", and the CPU is an example of the "processor".

The image display method according to the first embodiment further includes: for the setting image GC1, receiving the first operation of designating the point DG20 on the image GG1 from the user; receiving the second operation of designating the point DP20 on the captured image GP1 from the user; and displaying, in the region R3, the preview image GV1 including at least a part of the image GG2 obtained by deforming the image GG1 by making the point DG20 correspond to the point DP20. The image GG2 is the deformed image.

That is, the computer 1 can deform the image GG1 based on the correspondence relationship between the point DG and the point DP. Accordingly, the user can deform the shape of the image GG1 according to the captured image GP1 by designating the point DP according to the captured image GP1 and designating the point DG corresponding to the point DP on the image GG1.

In the first embodiment, the point DG20 is an example of a "first point", the point DP20 is an example of a "second point", the image GG2 is an example of a "second image", and the preview image GV1 is an example of a "preview image including at least a part of the second image".

The image display method according to the first embodiment further includes: while displaying the preview image GV1, receiving, from the user, at least one of the third operation of designating the point DG22 on the image GG1 substitutable for the point DG20 and the fourth operation of designating the point DP22 on the captured image GP1 substitutable for the point DP20; when the third operation is received and the fifth operation of instructing the deformation of the image GG1 is received from the user, displaying, in the region R3, the preview image GV2 including at least a part of the image GG3 obtained by deforming the image GG1 by making the point DG22 correspond to the point DP20; when the fourth operation is received and the fifth operation is received from the user, displaying, in the region R3, the preview image GV3 including at least a part of the image GG4 obtained by deforming the image GG1 by making the point DG20 correspond to the point DP22; and when the third operation and the fourth operation are received and the fifth operation is received from the user, displaying, in the region R3, the preview image GV4 including at least a part of the image GG5 obtained by deforming the image GG1 by making the point DG22 correspond to the point DP22. The image GG3, the image GG4, and the image GG5 are the deformed images.

That is, after the deformed image is generated, the computer 1 can receive the operation of designating the point DG substitutable for the point DG designated on the image GG1, or the operation of designating the point DP substitutable for the point DP designated on the captured image GP1. Accordingly, when checking, for example, the preview image GV and determining that the image GG1 is not appropriately deformed, the user can re-deform the image GG1.

In the first embodiment, the point DG22 is an example of a "third point", the point DP22 is an example of a "fourth point", the image GG3 is an example of a "third image", the image GG4 is an example of a "fourth image", and the image GG5 is an example of a "fifth image". Further, the preview image GV2 is an example of the "preview image including at least a part of the third image", the preview image GV3 is an example of the "preview image including at least a part of the fourth image", and the preview image GV4 is an example of a "preview image including at least a part of the fifth image".

The image display method according to the first embodiment further includes: while displaying the preview image GV1, receiving the sixth operation of designating the point DG26 on the image GG1 from the user; while displaying the preview image GV1, receiving, from the user, the seventh operation of designating the point DP26 on the captured image GP1; and when the fifth operation of instructing the deformation of the image GG1 is received from the user, displaying, in the region R3, the preview image GV5 including at least apart of the image GG6 obtained by deforming the image GG1 by making the point DG20 correspond to the point DP20 and making the point DG26 correspond to the point DP26. The image GG6 is the deformed image.

That is, after the deformed image is generated, the computer 1 can receive the operation of designating a new point DG in addition to the point DG designated on the image GG1, and the operation of designating a new point DP in addition to the point DP designated on the captured image GP1. Accordingly, when checking, for example, the preview image GV and determining that the image GG1 is not appropriately deformed, the user can re-deform the image GG1.

In the first embodiment, the point DG26 is an example of a "fifth point", the point DP26 is an example of a "sixth point", the image GG6 is an example of a "sixth image", and the preview image GV5 is an example of a "preview image including at least a part of the sixth image".

The image display method according to the first embodiment further includes: while displaying the preview image GV5, receiving, from the user, either one of the eighth operation of canceling the designation of the point DG20 or the point DP20, and the ninth operation of canceling the designation of the point DG26 or the point DP26; when the eighth operation is received and the fifth operation is received from the user, displaying, in the region R3, the preview image GV6 including at least a part of the image GG7 obtained by deforming the image GG1 by making the point DG26 correspond to the point DP26; and when the ninth operation is received and the fifth operation is received from the user, displaying, in the region R3, the preview image GV7 including at least a part of the image GG8 obtained by deforming the image GG1 by making the point DG20 correspond to the point DP20. The image GG7 and the image GG8 are the deformed images.

That is, after the deformed image is generated, the computer 1 can receive the operation of canceling the designation of the point DG designated on the image GG1 or the point DP designated on the captured image GP1. Accordingly, when checking, for example, the preview image GV and determining that the image GG1 is not appropriately deformed, the user can re-deform the image GG1.

In the first embodiment, the image GG7 is an example of a "seventh image", and the image GG8 is an example of an "eighth image". Further, the preview image GV6 is an example of a "preview image including at least a part of the seventh image", and the preview image GV7 is an example of a "preview image including at least a part of the eighth image".

In the image display method according to the first embodiment, the preview image GV is an image obtained by combining at least a part of the deformed image and the captured image GP1.

Accordingly, the user can check whether the deformed image is appropriately deformed according to the captured image GP1 by only viewing the preview image GV.

The image display method according to the first embodiment further includes: receiving, from the user, the tenth operation of designating whether the preview image GV includes the deformed image or includes the partially deformed image obtained by extracting a part of the deformed image based on the mask image GM1 generated from the captured image GP1; and switching whether the preview image GV includes the deformed image or includes the partially deformed image according to the tenth operation.

That is, the user can compare the deformed image with the partially deformed image. Accordingly, the user can easily check, for example, a size of a region to be removed by the mask image GM1.

In the first embodiment, the mask image GM1 is an example of a "mask image".

The image display method according to the first embodiment further includes: outputting the deformed image as an input image to the projector 7 that projects projection light corresponding to the input image onto the torso 3.

Accordingly, the computer 1 can display the projection image GS including the deformed image in a predetermined range on the torso 3 by causing the projector 7 to project projection light corresponding to the deformed image.

In the first embodiment, the projector 7 is an example of a "projector".

2. Modifications

The embodiment described above can be modified in various ways. Specific modifications will be exemplified below. Further, two or more aspects freely selected from the following examples may be appropriately combined within a range in which the two or more aspects do not contradict each other. In the modifications exemplified below, elements whose actions and functions are equivalent to those according to the above-described embodiment are denoted by the same reference signs as those used in the above description, and the detailed description is omitted as appropriate.

2.1. First Modification

In the above-described embodiment, a case has been exemplified in which the image GG1 to be deformed, the captured image GP1 referred to during the deformation, and the preview image GV including the deformed image or the partially deformed image are displayed side by side, but the present disclosure is not limited to such an aspect. For example, the image GG1, the captured image GP1, the preview image GV including the deformed image, and the preview image GV including the partially deformed image may be displayed side by side.

FIG. 34 is an illustrative diagram showing a setting image GC2. The setting image GC2 includes a region R4, a region R5, a region R6, and a region R7. Further, the setting image GC1 includes the button B1 and the button B3. The image GG1 is displayed in the region R4. The captured image GP1 is displayed in the region R5. The preview image GV including the deformed image is displayed in the region R6. In FIG. 34, the preview image GV1 is displayed as an example of the preview image GV including the deformed image. The preview image GV including the partially deformed image is displayed in the region R7. In FIG. 34, the preview image GV8 is displayed as an example of the preview image GV including the partially deformed image. Here, the deformed image is the image GG2. Further, the partially deformed image is the image GG9 generated by combining the image GG2 and the mask image GM'. Since the preview image GV including the deformed image and the preview image GV including the partially deformed image are simultaneously displayed, the setting image GC2 does not need the button B2 for switching the preview images GV.

As described above, in the image display method according to the first modification, the setting image GC2 further includes the region R7, one of the preview image GV1 including the image GG2 and the preview image GV8 including the image GG9 obtained by extracting a part of the image GG2 based on the mask image GM1 generated from the captured image GP1 is displayed in the region R6, and the other of the preview image GV1 and the preview image GV8 is displayed in the region R7.

That is, the computer according to the present modification can simultaneously display the image GG1 that is an image before deformation, the preview image GV1 including the image GG2 obtained by deforming the image GG1, and the preview image GV8 including the image GG9 obtained by extracting a part of the image GG2 based on the mask image GM'. Accordingly, the user can accurately check whether an image is appropriately deformed into a desired shape by comparing images before and after deformation. Further, the user can check, for example, a size of a region to be removed by the mask image GM'.

In the first modification, the setting image GC2 is an example of the "setting image", the region R7 is an example of the "fourth region", the region R6 is an example of the "third region", the image GG2 is an example of the "deformed image", the preview image GV1 is an example of the "preview image including the deformed image", the captured image GP1 is an example of the "captured image", the mask image GM1 is an example of the "mask image", the image GG9 is an example of the "partially deformed image", and the preview image GV8 is an example of the "preview image including the partially deformed image".

2.2. Second Modification

In the above-described embodiment and modification, a case has been exemplified in which the image GG1 is deformed by receiving the operation from the user who touches the button B1 on the setting image, but the present disclosure is not limited to such an aspect. For example, the image GG1 may be deformed by receiving, from the user, either one of an operation of designating the point DG substitutable for the point DG designated on the image GG1 and an operation of designating the point DP substitutable for the point DP designated on the captured image GP1. Accordingly, the user does not need an operation of touching the button B1 on the setting image.

As described above, the image display method according to the second modification further includes: while displaying the preview image GV1, receiving, from the user, either one of the third operation of designating the point DG22 on the image GG1 substitutable for the point DG20 and the fourth operation of designating the fourth point on the captured image GP1 substitutable for the point DP20; when the third operation is received from the user, displaying, in the region R3, the preview image GV2 including at least a part of the image GG3 obtained by deforming the image GG1 by making the point DG22 correspond to the point DP20; and when the fourth operation is received from the user, displaying, in the region R3, the preview image GV3 including at least a part of the image GG4 obtained by deforming the image GG1 by making the point DG20 correspond to the point DP22. The image GG3 and the image GG4 are the deformed images.

That is, after the deformed image is generated, the computer according to the present modification can receive the operation of designating the point DG substitutable for the point DG designated on the image GG1, or the operation of designating the point DP substitutable for the point DP designated on the captured image GP1. Accordingly, when checking, for example, the preview image GV and determining that the image GG1 is not appropriately deformed, the user can re-deform the image GG1. Further, the user can re-deform the image GG1 without performing an operation of instructing the deformation of the image GG1.

In the second modification, the image GG1 is an example of a "first image", the captured image GP1 is an example of a "captured image", the region R3 is an example of a "third region", the preview image GV is an example of a "preview image", the preview image GV1 is an example of a "preview image including at least a part of a second image", the point DG20 is an example of a "first point", the point DP20 is an example of a "second point", the point DG22 is an example of a "third point", the point DP22 is an example of a "fourth point", the image GG3 is an example of a "third image", and the image GG4 is an example of a "fourth image". Further, the preview image GV2 is an example of a "preview image including at least a part of the third image", and the preview image GV3 is an example of a "preview image including at least a part of the fourth image".

2.3. Third Modification

In the above-described embodiment and modifications, a case has been exemplified in which the image GG1 is deformed by receiving the operation from the user who touches the button B1 on the setting image, but the present disclosure is not limited to such an aspect. For example, the image GG1 may be deformed by receiving, from the user, an operation of designating a new point DG in addition to the point DG designated on the image GG1 and an operation of designating a new point DP in addition to the point DP designated on the captured image GP1. Accordingly, the user does not need an operation of touching the button B1 on the setting image.

As described above, the image display method according to the third modification further includes: while displaying the preview image GV1, receiving, from the user, a sixth operation of designating the point DG26 on the image GG1; while displaying the preview image GV1, receiving, from the user, the seventh operation of designating the point DP26 on the captured image GP1; and when the sixth operation and the seventh operation are received, displaying, in the region R3, the preview image GV5 including at least a part of the image GG6 obtained by deforming the image GG1 by making the point DG20 correspond to the point DP20 and making the point DG26 correspond to the point DP26. The image GG6 is the deformed image.

That is, after the deformed image is generated, the computer according to the present modification can receive an operation of designating a new point DG in addition to the point DG designated on the image GG1 and an operation of designating a new point DP in addition to the point DP designated on the captured image GP1. Accordingly, when checking, for example, the preview image GV and determining that the image GG1 is not appropriately deformed, the user can re-deform the image GG1. Further, the user can re-deform the image GG1 without performing an operation of instructing the deformation of the image GG1.

In the third modification, the image GG1 is an example of a "first image", the captured image GP1 is an example of a "captured image", the region R3 is an example of a "third region", the preview image GV1 is an example of a "preview image including at least a part of a second image", the point DG20 is an example of a "first point", the point DP20 is an example of a "second point", the point DG26 is an example of a "fifth point", the point DP26 is an example of a "sixth point", the image GG6 is an example of a "sixth image", and the preview image GV5 is an example of a "preview image including at least a part of the sixth image".

2.4. Fourth Modification

In the above-described embodiment and modifications, a case has been exemplified in which the display of the preview image GV including the deformed image and the display of the preview image GV including the partially deformed image are switched according to the operation from the user, but the present disclosure is not limited to such an aspect. For example, the preview image GV including the partially deformed image alone may be displayed. Accordingly, the user does not need an operation of touching the button B2 on the setting image.

As described above, in the image display method according to the fourth modification, the preview image GV is an image obtained by combining the partially deformed image obtained by extracting a part of a deformed image based on the mask image GM1 generated from the captured image GP1 and the captured image GP1.

Accordingly, the computer according to the present modification can display the preview image GV in a state in which an unnecessary portion of the deformed image is removed in advance by the mask image GM'.

In the fourth modification, the preview image GV is an example of a "preview image", the captured image GP1 is an example of a "captured image", and the mask image GM1 is an example of a "mask image".

2.5. Fifth Modification

In the above-described embodiment and modifications, a case has been exemplified in which the marker MG and the marker MP each include the cross symbol indicating the position of the point and the number indicating the correspondence relationship between the point DG and the point DP, but the present disclosure is not limited to such an aspect.

For example, an arrow indicating a position of a point may be included instead of using the cross symbol. In addition, a symbol or a picture that can clearly indicate a position of a point may be included.

Further, for example, instead of using the number, a character such as "A", "B", "C", and "D", or "α", "β", "γ", and "δ" may be included. Further, both the number and the character such as "No. 1" and "No. 20" may be included. The number is not limited to an Arabic number, and may be, for example, a Roman number.

The marker MG and the marker MP may be displayed in colors different from each other. For example, the marker MG may be displayed in blue, and the marker MP may be displayed in red.

2.6. Sixth Modification

In the above-described embodiment and modifications, a case has been exemplified in which the mask image for generating the partially deformed image is acquired from the external server, but the present disclosure is not limited to such an aspect. The mask image for generating the partially deformed image may be generated in the information processing apparatus according to the present disclosure. For example, the mask image may be generated by selecting a contour of an image of the torso 3 included in the captured image GP1 using an image editing software or the like, and filling an inside of the contour with white and an outside of the contour with black.

2.7. Seventh Modification

In the above-described embodiment and modifications, a case has been exemplified in which the deformed image is converted based on the output table 112 and the converted deformed image is output to the projector 7, but the present disclosure is not limited to such an aspect. Instead of using the deformed image, the partially deformed image may be converted, and the converted partially deformed image may be output to the projector 7.

2.8. Eighth Modification

In the above-described embodiment and modifications, the computer 1 is exemplified as the information processing apparatus according to the present disclosure, but a smartphone or a tablet terminal having functions similar to those of the computer 1 may be used instead of using the computer 1. For example, when the smartphone is used, the smartphone may have functions similar to those of the camera 5 in addition to the functions similar to those of the computer 1.

What is claimed is:

1. An image display method comprising:
   acquiring a first image;
   acquiring a captured image obtained by imaging a projection receiving object of projection light; and
   displaying a setting image including a first region in which the first image is displayed, a second region in which the captured image is displayed, and a third region in which a preview image including at least a part of a deformed image obtained by deforming the first image according to an image of the projection receiving object included in the captured image is displayed.

2. The image display method according to claim 1, further comprising:
   in the setting image,
   receiving a first operation of designating a first point on the first image from a user;
   receiving a second operation of designating a second point on the captured image from the user; and
   displaying, in the third region, a preview image including at least a part of a second image obtained by deforming the first image by making the first point correspond to the second point, wherein
   the second image is the deformed image.

3. The image display method according to claim 2, further comprising:
   while displaying the preview image including at least a part of the second image, receiving, from the user, at least one of a third operation of designating a third point on the first image substitutable for the first point and a fourth operation of designating a fourth point on the captured image substitutable for the second point;
   when the third operation is received and a fifth operation of instructing deformation of the first image is received from the user, displaying, in the third region, a preview image including at least a part of a third image obtained by deforming the first image by making the third point correspond to the second point;
   when the fourth operation is received and the fifth operation is received from the user, displaying, in the third region, a preview image including at least a part of a fourth image obtained by deforming the first image by making the first point correspond to the fourth point; and
   when the third operation and the fourth operation are received and the fifth operation is received from the user, displaying, in the third region, a preview image including at least a part of a fifth image obtained by deforming the first image by making the third point correspond to the fourth point, wherein
   the third image, the fourth image, and the fifth image are the deformed images.

4. The image display method according to claim 2, further comprising:
   while displaying the preview image including at least a part of the second image, receiving a sixth operation of designating a fifth point on the first image from the user;
   while displaying the preview image including at least a part of the second image, receiving a seventh operation of designating a sixth point on the captured image from the user; and
   when a fifth operation of instructing deformation of the first image is received from the user, displaying, in the third region, a preview image including at least a part of a sixth image obtained by deforming the first image by making the first point correspond to the second point and making the fifth point correspond to the sixth point, wherein
   the sixth image is the deformed image.

5. The image display method according to claim 4, further comprising:

while displaying the preview image including at least a part of the sixth image, receiving, from the user, either one of an eighth operation of canceling designation of the first point or the second point, or a ninth operation of canceling designation of the fifth point or the sixth point;

when the eighth operation is received and the fifth operation is received from the user, displaying, in the third region, a preview image including at least a part of a seventh image obtained by deforming the first image by making the fifth point correspond to the sixth point; and when the ninth operation is received and the fifth operation is received from the user, displaying, in the third region, a preview image including at least a part of an eighth image obtained by deforming the first image by making the first point correspond to the second point, wherein the seventh image and the eighth image are the deformed images.

6. The image display method according to claim 2, further comprising:

while displaying the preview image including at least a part of the second image, receiving, from the user, either one of a third operation of designating a third point on the first image substitutable for the first point or a fourth operation of designating a fourth point on the captured image substitutable for the second point;

when the third operation is received from the user, displaying, in the third region, a preview image including at least a part of a third image obtained by deforming the first image by making the third point correspond to the second point; and when the fourth operation is received from the user, displaying, in the third region, a preview image including at least a part of a fourth image obtained by deforming the first image by making the first point correspond to the fourth point, wherein the third image and the fourth image are the deformed images.

7. The image display method according to claim 2, further comprising:

while displaying the preview image including at least a part of the second image, receiving a sixth operation of designating a fifth point on the first image from the user;

while displaying the preview image including at least a part of the second image, receiving a seventh operation of designating a sixth point on the captured image from the user; and when the sixth operation and the seventh operation are received, displaying, in the third region, a preview image including at least a part of a sixth image obtained by deforming the first image by making the first point correspond to the second point and making the fifth point correspond to the sixth point, wherein the sixth image is the deformed image.

8. The image display method according to claim 1, wherein the preview image is an image obtained by combining at least a part of the deformed image and the captured image.

9. The image display method according to claim 8, wherein the preview image is an image obtained by combining a partially deformed image obtained by extracting a part of the deformed image based on a mask image generated from the captured image and the captured image.

10. The image display method according to claim 8, further comprising:

receiving, from the user, a tenth operation of designating whether the preview image includes the deformed image or includes a partially deformed image obtained by extracting a part of the deformed image based on a mask image generated from the captured image; and switching whether the preview image includes the deformed image or the partially deformed image according to the tenth operation.

11. The image display method according to claim 8, wherein the setting image further includes a fourth region, one of a preview image including the deformed image and a preview image including a partially deformed image obtained by extracting apart of the deformed image based on a mask image generated from the captured image is displayed in the third region, and the other of the preview image including the deformed image and the preview image including the partially deformed image is displayed in the fourth region.

12. The image display method according to claim 1, further comprising:

outputting the deformed image as an input image to a projector configured to project projection light corresponding to the input image onto the projection receiving object.

13. An information processing apparatus comprising:
one or more processors, wherein
the one or more processors
acquire a first image,
acquire a captured image obtained by imaging a projection receiving object of projection light, and
cause a display device to display a setting image including a first region in which the first image is displayed, a second region in which the captured image is displayed, and a third region in which a preview image including at least a part of a deformed image obtained by deforming the first image according to an image of the projection receiving object included in the captured image is displayed.

14. A non-transitory recording medium having a program recorded thereon for causing a processor to
acquire a first image,
acquire a captured image obtained by imaging a projection receiving object of projection light, and
cause a display device to display a setting image including a first region in which the first image is displayed, a second region in which the captured image is displayed, and a third region in which a preview image including at least a part of a deformed image obtained by deforming the first image according to an image of the projection receiving object included in the captured image is displayed.

* * * * *